(12) United States Patent
King

(10) Patent No.: US 7,887,330 B2
(45) Date of Patent: Feb. 15, 2011

(54) TRAUMA TRAINING SYSTEM

(75) Inventor: Lynn R. King, Kearney, NE (US)

(73) Assignee: The United States of America as represented by the Secretary of the Army, Washington, DC (US)

(*) Notice: Subject to any disclaimer, the term of this patent is extended or adjusted under 35 U.S.C. 154(b) by 967 days.

(21) Appl. No.: 11/739,064

(22) Filed: Apr. 23, 2007

(65) Prior Publication Data
US 2007/0243512 A1 Oct. 18, 2007

Related U.S. Application Data

(63) Continuation-in-part of application No. PCT/US2005/043771, filed on Dec. 2, 2005.

(60) Provisional application No. 60/794,108, filed on Apr. 24, 2006, provisional application No. 60/811,779, filed on Jun. 8, 2006, provisional application No. 60/822,888, filed on Aug. 18, 2006, provisional application No. 60/635,432, filed on Dec. 2, 2004.

(51) Int. Cl.
G09B 23/28 (2006.01)
(52) U.S. Cl. .................................. 434/268
(58) Field of Classification Search ............ 434/262, 434/267, 268, 272
See application file for complete search history.

(56) References Cited

U.S. PATENT DOCUMENTS

| | | | |
|---|---|---|---|
| 2,213,270 A | 9/1940 | Chase | |
| 2,752,697 A | 3/1956 | Lawall | |
| 3,027,655 A * | 4/1962 | Alderson | 434/268 |
| 3,785,752 A | 1/1974 | Crespo | |
| 3,797,130 A * | 3/1974 | Knapp et al. | 434/273 |

(Continued)

FOREIGN PATENT DOCUMENTS

WO  WO 96/42076 A  12/1996

(Continued)

OTHER PUBLICATIONS

Australian Government—IP Australia, Examiner's first report on patent application No. 2005311665, pp. 1-2, Jul. 23, 2009.

(Continued)

Primary Examiner—Kurt Fernstrom
(74) Attorney, Agent, or Firm—Elizabeth Arwine

(57) ABSTRACT

A system for simulating one or more hemorrhages in order to provide a more dynamic and realistic hemorrhage simulation in order to train medical personnel and other critical care givers, such as first responders, medics, and emergency medical technicians (EMTs) on treating hemorrhages. The system includes a reservoir, a flow controller, and at least one conduit connected to at least one simulated wound site wherein the system supplies fluid to the simulated wound site in order to simulate a hemorrhage. The system may further include a plurality of wound sites that have their respective fluid flows controlled by the fluid flow controller. In at least one embodiment, the reservoir and the flow controller are housed within a bag. In at least one embodiment, the system further includes an audio system for providing audio cues to the simulation participants to enhance the realism of the simulation.

18 Claims, 20 Drawing Sheets

U.S. PATENT DOCUMENTS

| | | | | |
|---|---|---|---|---|
| 3,852,893 | A * | 12/1974 | Smrcka | 434/268 |
| 4,331,426 | A * | 5/1982 | Sweeney | 434/265 |
| 4,627,111 | A | 12/1986 | Storie | |
| 4,773,865 | A | 9/1988 | Baldwin | |
| 5,101,830 | A | 4/1992 | Duffy et al. | |
| 5,374,194 | A * | 12/1994 | Walcerz et al. | 434/265 |
| 5,397,237 | A | 3/1995 | Dhont et al. | |
| 5,634,797 | A * | 6/1997 | Montgomery | 434/268 |
| 5,645,404 | A | 7/1997 | Zelenak | |
| 5,890,908 | A * | 4/1999 | Lampotang et al. | 434/268 |
| 6,234,804 | B1 * | 5/2001 | Yong | 434/267 |
| 6,296,490 | B1 * | 10/2001 | Bowden | 434/265 |
| 6,527,558 | B1 * | 3/2003 | Eggert et al. | 434/262 |
| 6,790,043 | B2 | 9/2004 | Aboud | |
| 7,021,940 | B2 * | 4/2006 | Morris et al. | 434/268 |
| 7,226,420 | B2 | 6/2007 | Machit et al. | |
| 7,247,027 | B2 * | 7/2007 | Hoster, Jr. | 434/262 |
| 7,306,465 | B2 | 12/2007 | White | |
| 2004/0101814 | A1 | 5/2004 | Morris et al. | |

FOREIGN PATENT DOCUMENTS

| | | |
|---|---|---|
| WO | WO 98/24335 A1 | 6/1998 |
| WO | WO 01/39620 A1 | 6/2001 |
| WO | WO 2006/060724 | 8/2006 |

OTHER PUBLICATIONS

Australian Government—IP Australia, Examiner's second report on patent application No. 2005311665, pp. 1-2, Mar. 2, 2010.

Photo #1 of admitted prior art.

Photo #2 of admitted prior art.

Photo #3 of admitted prior art.

West Virginia University, Department of Anesthesiology, "Human Simulator," http://www.hsc.wvu.edu/som/anesth/humanSimulator.asp, printed Apr. 19, 2007.

Israel Center for Medical Simulation,"Advanced Life Support—Patient Simulators," http://www.msr.org.il/medical_simulation_equipment/78.htm, printed Apr. 19, 2007.

Laerdal, "Trauma Make-up," http://www.laerdal.com/document.asp?subnodeid=14123470, printed Apr. 19, 2007.

Laerdal, "BTLS Victim Injury Set," http://www.laerdal.com/document.asp?subnodeid=7423397, printed Apr. 19, 2007.

The BEST Foundation, "Simple Mannequin or Live Model? Preliminary results from cross-over comparison," Norwegian Medical Association, Bergen, Norway.

Medical Education Technologies, Inc., "Emergency Care Simulator," http://www.meti.com/Product_ECS.html, printed Nov. 23, 2005.

Ward, John, "Army hires dummies, at $44,000 each," National Post, Mar. 4, 2004, vol. 6, No. 109, The Canadian Press.

National Aeronautics and Space Administration, "An Enhanced Emergency Care Simulator," http://sbir.gsfc.nasa.gov/SBIR/successes/ss/9-067test.html, printed Nov. 23, 2005.

Colucci, Frank, "More than Mannequins," Military Medical Technology, vol. 8, Iss. 1, http://www.temple.edu/ispr/examples/ex04_05_06.html, printed Nov. 23, 2005.

Laerdal, "Ultimate Hurt," http://www.laerdal.com/document.asp?subnodeid=7423385, printed Nov. 23, 2005.

Laerdal, "201-00001 Ultimate Hurt," http://www.laerdal.com/document.asp?subnodeid=7423387, printed Nov. 23, 2005.

Medical Education Technologies, Inc., "Trauma/Disaster Casualty Kit," printed 2003.

Medical Education Technologies, Inc., "Human Patient Simulator," printed 2004.

Eason, Martin P. MD, Linville, M. David MD, Stanton, Charles MS, "A System to Simulate Arterial Blood Flow for Cannulation in the Human Patient Simulator," Anesthesiology, Aug. 2005, 443, vol. 103, No. 2, The American Society of Anesthesiologists.

Quinones, Melissa, "The Future of Medical Education: Integration of Medical Simulation into Training Programs is a Growing Trend and the US Navy is out in front," Military Medical Technology, Aug. 11, 2005.

Medical Education Technologies, Inc., "IStan, smart, evolved, unplugged" printed 2007.

* cited by examiner

TRAUMA TRAINING SYSTEM

This patent application claims the benefit of U.S. Provisional Patent Application No. 60/794,108, filed Apr. 24, 2006, U.S. Provisional Patent Application No. 60/811,779, filed Jun. 8, 2006, and U.S. Provisional Patent Application No. 60/822,888, filed Aug. 18, 2006. This patent application is a continuation-in-part application of Patent Cooperation Treaty Application No. PCT/US2005/043771, filed Dec. 2, 2005 and published Jun. 8, 2006, which claims priority to U.S. Provisional Patent Application No. 60/635,432, filed Dec. 2, 2004. All of these patent applications are hereby incorporated by reference.

I. FIELD OF THE INVENTION

This invention relates to a system and method for simulating one or more hemorrhages in order to provide a more dynamic and realistic hemorrhage simulation in order to train medical personnel and other critical care givers, such as first responders, medics, and emergency medical technicians (EMTs) on treating hemorrhages.

II. BACKGROUND OF THE INVENTION

Trauma training systems, such as mannequins and other treatment simulation devices, are used to train individuals in a variety of medical situations. These medical situations may span a wide range of simulations—from cardiopulmonary resuscitation (CPR) to emergency room situations. Because of this wide range of applications, the complexity of many of these devices is impacted by the simulations intended to be performed with the device.

One of the more common simulation devices is the basic mannequin. A basic mannequin may be either a partial or whole human body—depending on the intended use—that allows a user, typically a trainee, to interact with it. For example, a CPR mannequin allows for chest compressions and assisted breathing but could not be used to simulate other medical situations.

At the other end of the trauma training device spectrum are much more complex devices that are typically mannequins that provide simulation capabilities for many different or more detailed simulations to be performed. These mannequins are typically controlled by preprogrammed software that allows a trainer to use a variety of optional simulations based on feedback from the users but requires extensive preparation prior to a simulation. These simulations provide an interactive "simulation tree" such that the simulation reacts to the choices made by the trainees. Consequently, these complex treatment devices are not suited for large training situations, as least in part because of the need to train the trainers on how to use the entire system. In addition, as the complexity of these treatment devices increases, so does the fragility the devices such that the devices are not well-suited for in-field training and the ability to have multiple units for a mass casualty situation is limited given the high cost of these systems.

Other training situations use humans acting as injured individuals in mass trauma simulations with cards telling them what their respective injuries are and what to do. A problem with these simulations is that the injuries are static such as a wound being liquid soaked clothes possibly with make-up with the actor providing additional feedback and information in response to the treatment received.

Notwithstanding the usefulness of the above-described methods, a need still exists for a trauma training system that provides dynamic and realistic bleeding simulation to at least one simulated wound site in order to replicate a live traumatic bleeding situation.

III. SUMMARY OF THE INVENTION

In at least one exemplary embodiment, the invention includes a trauma training system for replicating at least one hemorrhage, the system comprising: a collapsible reservoir capable of storing fluid, a pump in fluid communication with the reservoir, at least one valve in fluid communication with the pump, a controller connected to the pump and the at least one valve, and at least one wound site detachably in fluid communication with the valve, wherein fluid is provided to the wound site to simulate a hemorrhage, In at least one exemplary embodiment, the invention includes a trauma training system comprising: a mannequin, a reservoir housed in the mannequin, a flow controller in fluid communication with the reservoir and housed in the mannequin, and at least one wound site disposed on the mannequin and in fluid communication with the flow controller, wherein fluid is delivered from the reservoir to the wound site to simulate a hemorrhage.

In at least one exemplary embodiment, the invention includes a trauma training system comprising: a collapsible reservoir, a pump in fluid communication with the cavity of the reservoir, a valve connected to the pump, a controller connected to the pump and the valve, a housing containing the reservoir, the pump, and the valve, and at least one wound site detachably connected to the valve.

The invention in at least one embodiment provides an easy to use system with minimal training required prior to use while maintaining extreme flexibility for a simulation.

IV. BRIEF DESCRIPTION OF THE DRAWINGS

The present invention is described with reference to the accompanying drawings.

Given the following enabling description of the drawings, the apparatus should become evident to a person of ordinary skill in the art.

V. DETAILED DESCRIPTION OF THE DRAWINGS

Figure 1A:
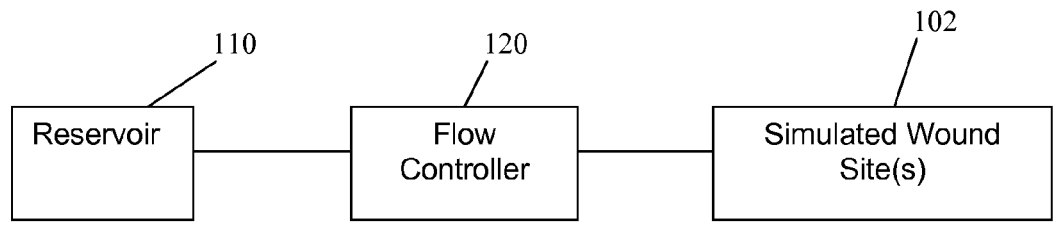
FIGS. 1A-1B illustrate block diagrams of exemplary embodiments of the trauma training system in accordance with the present invention.

The present invention includes a trauma training system that simulates bleeding wounds such as hemorrhages. As illustrated in FIG. 1A, the invention includes a reservoir (a container or other fluid source) 110, a fluid flow controller 120 in communication with the reservoir 110, and at least one simulated wound site 102 in communication with the fluid flow controller 120. The system is capable of integration, for example, into a mannequin, a body suit, or a bag/backpack among other types of housings. The fluid supplied to the wound sites 102 replicates bleeding wounds and permits the system to be utilized in training individuals, such as medical care providers and first responders, in the treatment of traumatic injuries, particularly bleeding wounds.

Figure 1B:
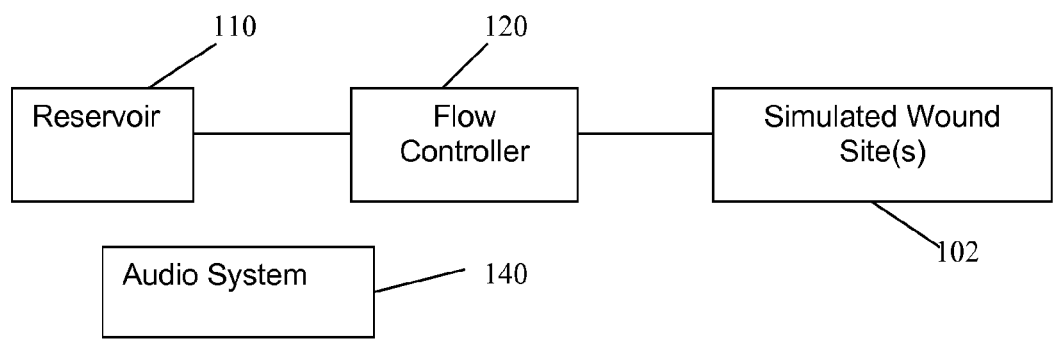
Figure 6A:
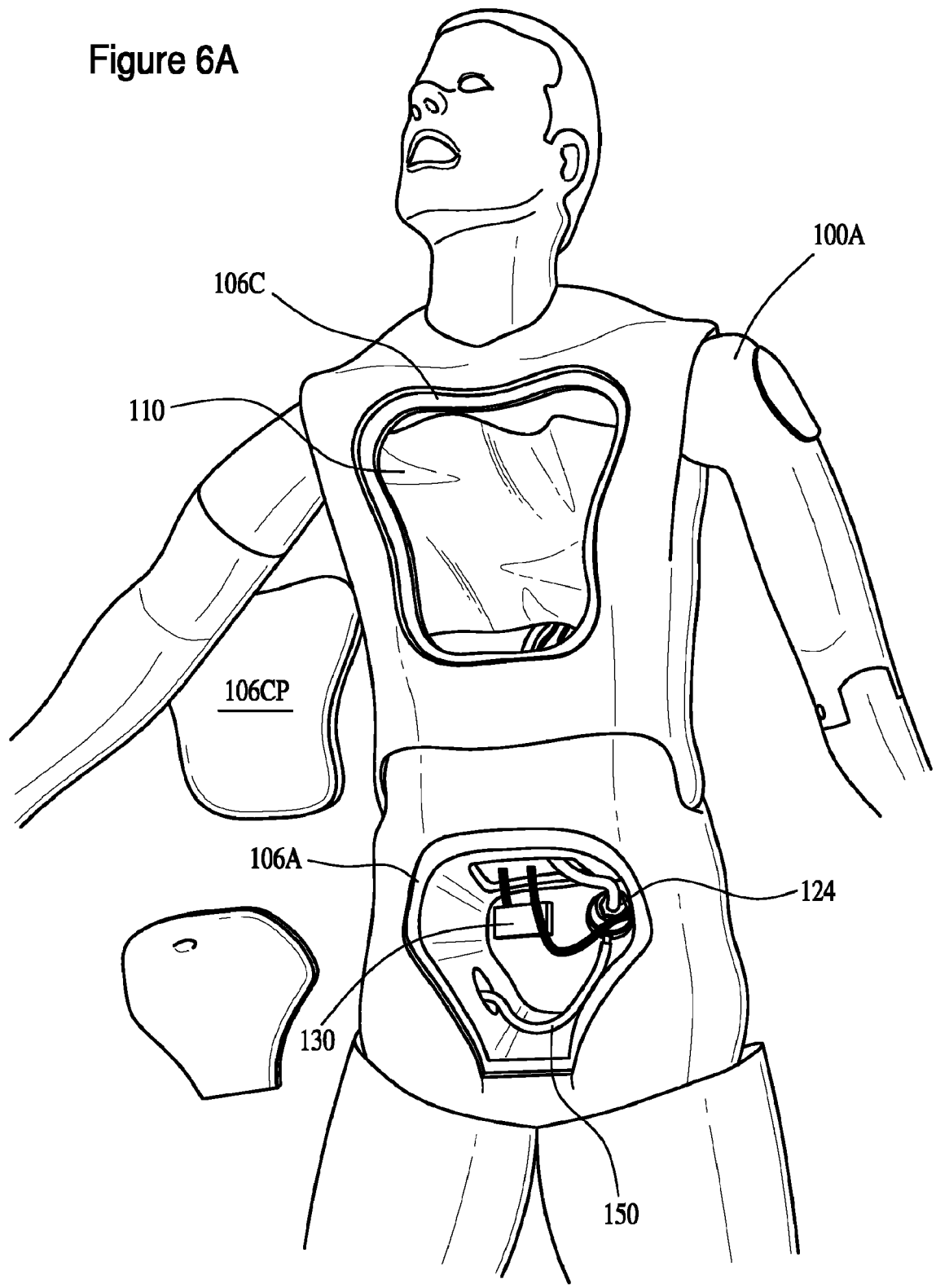
FIG. 6A illustrates a trauma training system in accordance with an exemplary embodiment of the present invention.
Figure 6B:
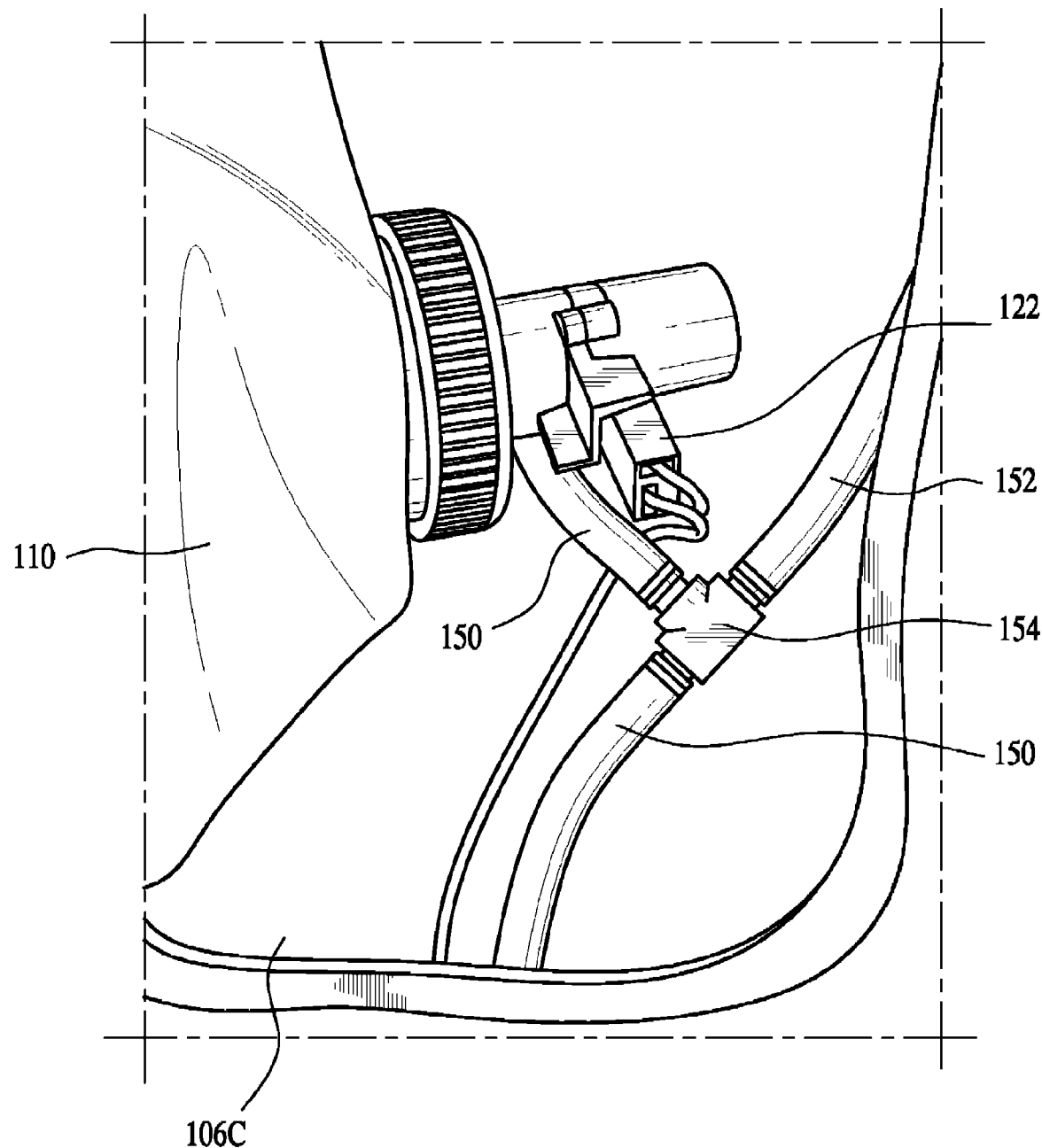
FIG. 6B illustrates the chest cavity of a trauma training system illustrated in FIG. 6A.

The connection between the reservoir 110 and the fluid flow controller 120 can be accomplished in a variety of ways including having the fluid flow controller located within the container, for example, a submersible pump including being integrated into the cap for the reservoir (as illustrated, for example, in FIG. 6B; the fluid flow controller having a conduit inserted into the container with the fluid flow controller attached to the connector; and the fluid flow controller connected to the container with conduit. The connection between the fluid flow controller and the at least one wound site also can be accomplished in a variety of ways including having a conduit system between the fluid flow controller and the at least one wound system, and the fluid flow controller attached to the at least one wound system to pump the fake blood right to the at least one wound system. In FIGS. 1A and 1B, the connection between these components is illustrated as a line that is representative of these different ways.

In some exemplary embodiments as illustrated in FIG. 1B, the system further includes an audio system 140 that provides audio information to further provide a realistic simulation. The audio system 140 provides a means for providing audio cues to the individuals participating in the simulation and/or to the person wearing the system. The audio system enables interactive training by providing a "simulation tree" where the system reacts to the actions and choice made by the trainee such that more specialized and realistic training is possible.

Exemplary reservoirs 110 include flexible membranes and containers that are capable of holding fluid for dispensing through the system to simulate bleeding and that are collapsible as fluid is drawn out of the reservoir to keep the pump 120 primed. In at least one embodiment, the reservoir 110 is housed within an elastic bag that constricts as fluid is drawn from the reservoir 110. In other embodiments, the reservoir 110 is an elastic container that sizes to fit the volume of fluid. Depending upon the implementation, the reservoir can range in size from several milliliters to 10 liters and higher depending upon the space that is allotted for the reservoir. Different embodiments as described below include mannequins, body suits, bag enclosures, and backpacks for housing parts or all of the system and as such different levels of space will be available all of which collective are housings. The range of sizes will become more apparent in connection with the discussion of different exemplary embodiments below. The reservoir 110 can be integrally formed within the structure that houses the system. For example, in the mannequin, utility belt and backpack embodiments the reservoir can be formed as its own compartment within the interior of the mannequin or in the utility belt and the backpack. In contrast, in a retrofit situation, the reservoir 110 is a separate component that is placed in the structure.

Figure 1C:
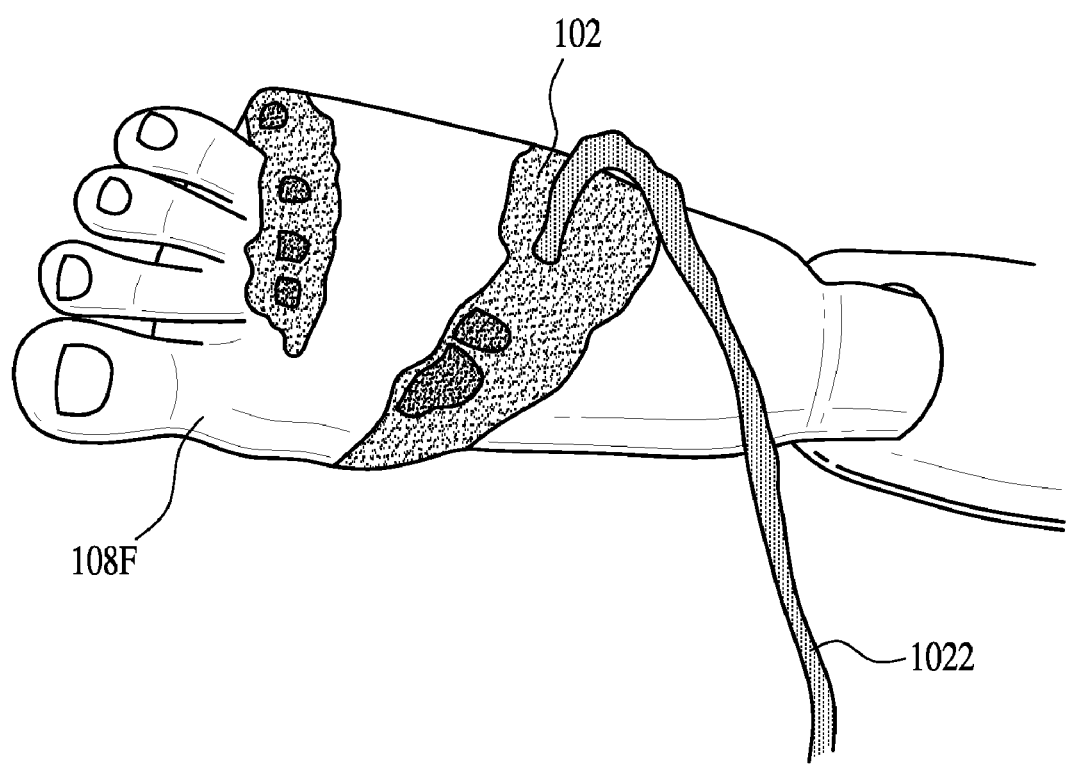
FIG. 1C illustrates an extremity or foot of a trauma training system in accordance with an exemplary embodiment of the present invention.

FIG. 1C illustrates an exemplary simulated wound site(s) that may be located anywhere on the body, including extremities such as the arms, legs and feet. FIG. 1C, for example, illustrates simulated wound site 102 located on the top of the foot 108F. FIG. 1C also illustrates an example of a stream of fake blood 1022 being dispensed from the simulated wound site 102. The location of the wound site 102 could be placed anywhere on a mannequin or a human and may be in multiple locations as appropriate, for example, to teach the need to carefully check a patient for multiple hemorrhage sites.

Figure 2A:
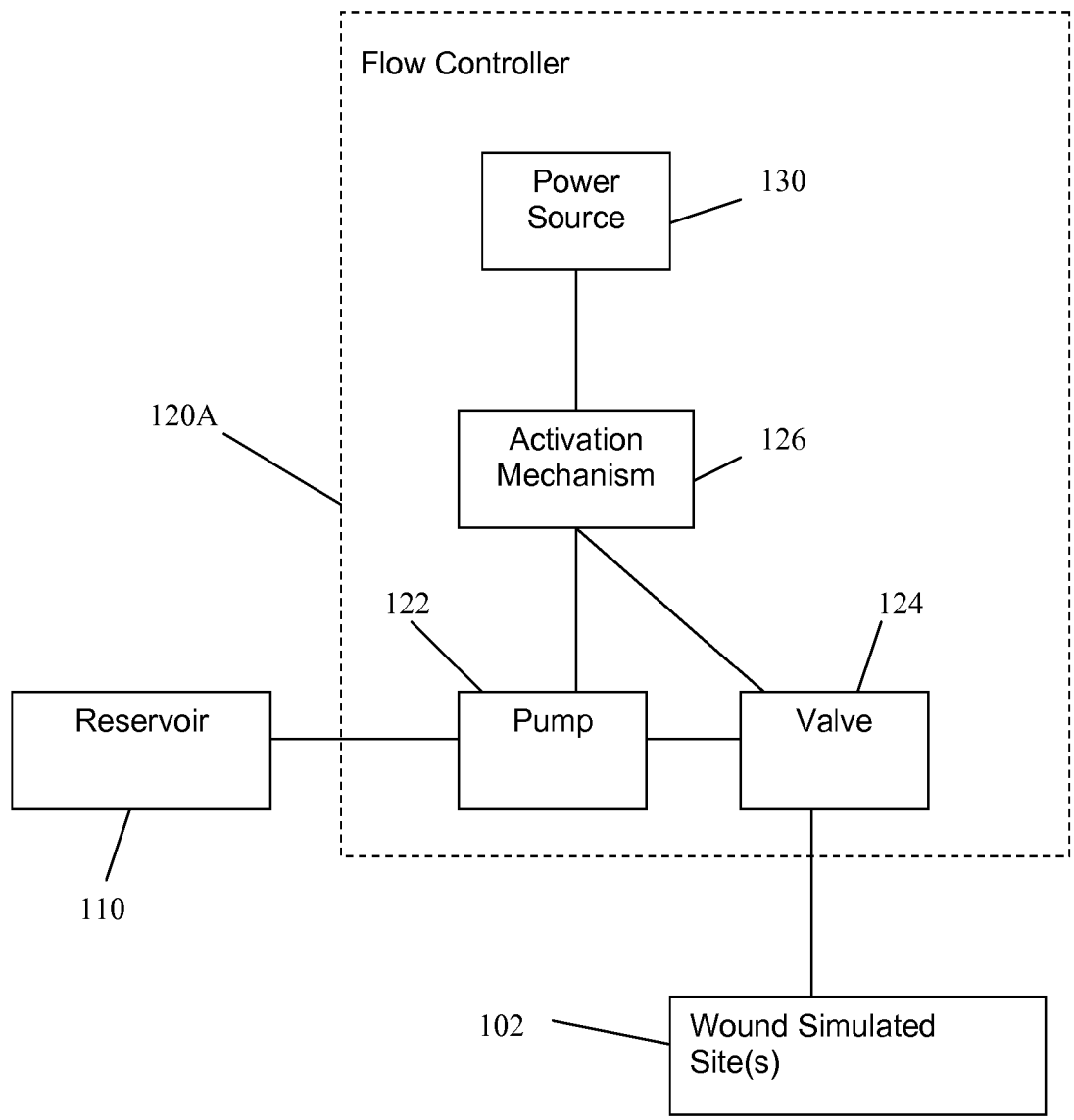
FIGS. 2A-2C illustrate block diagrams of exemplary embodiments of the trauma training system in accordance with the present invention.
Figure 2B:
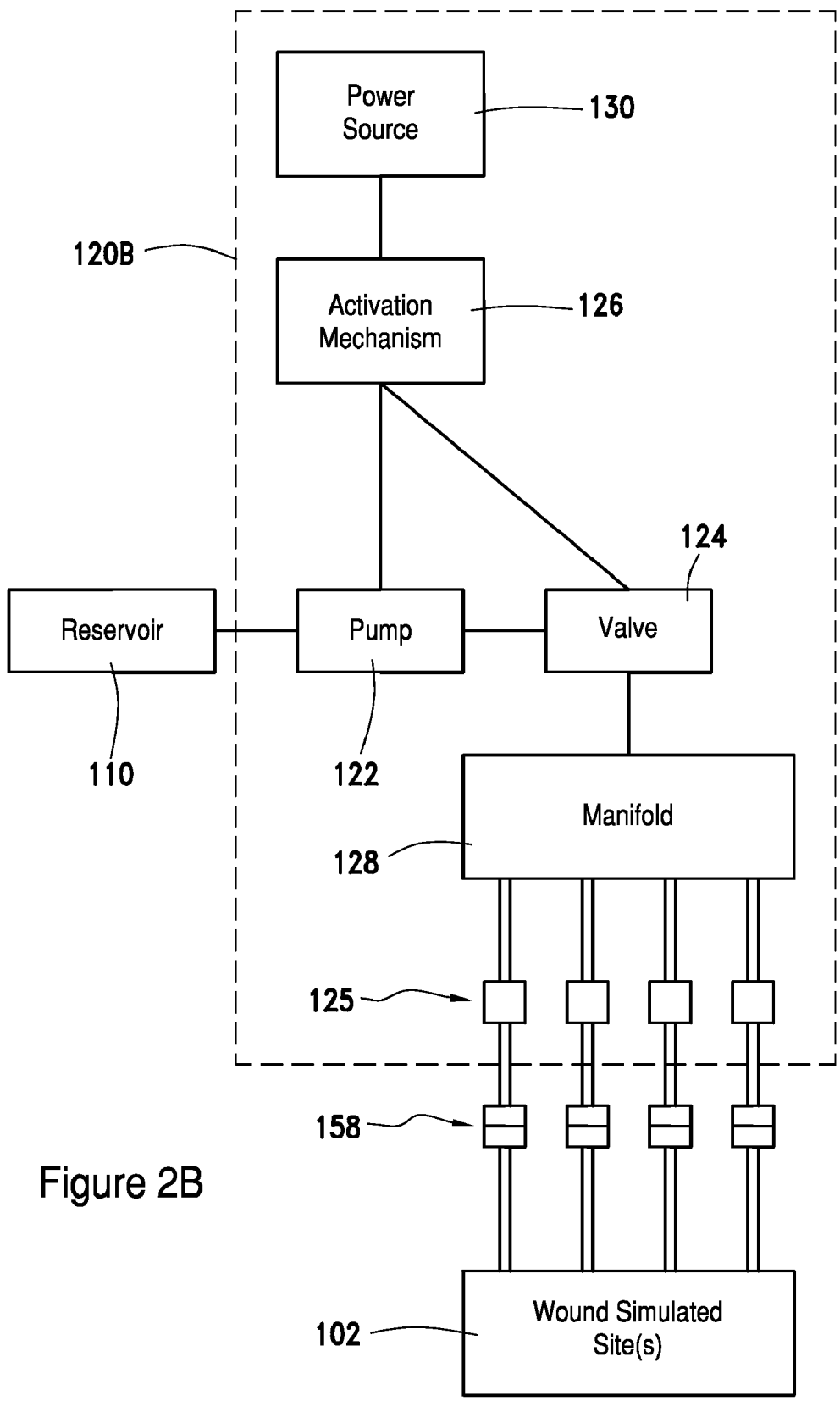
Figure 2C:
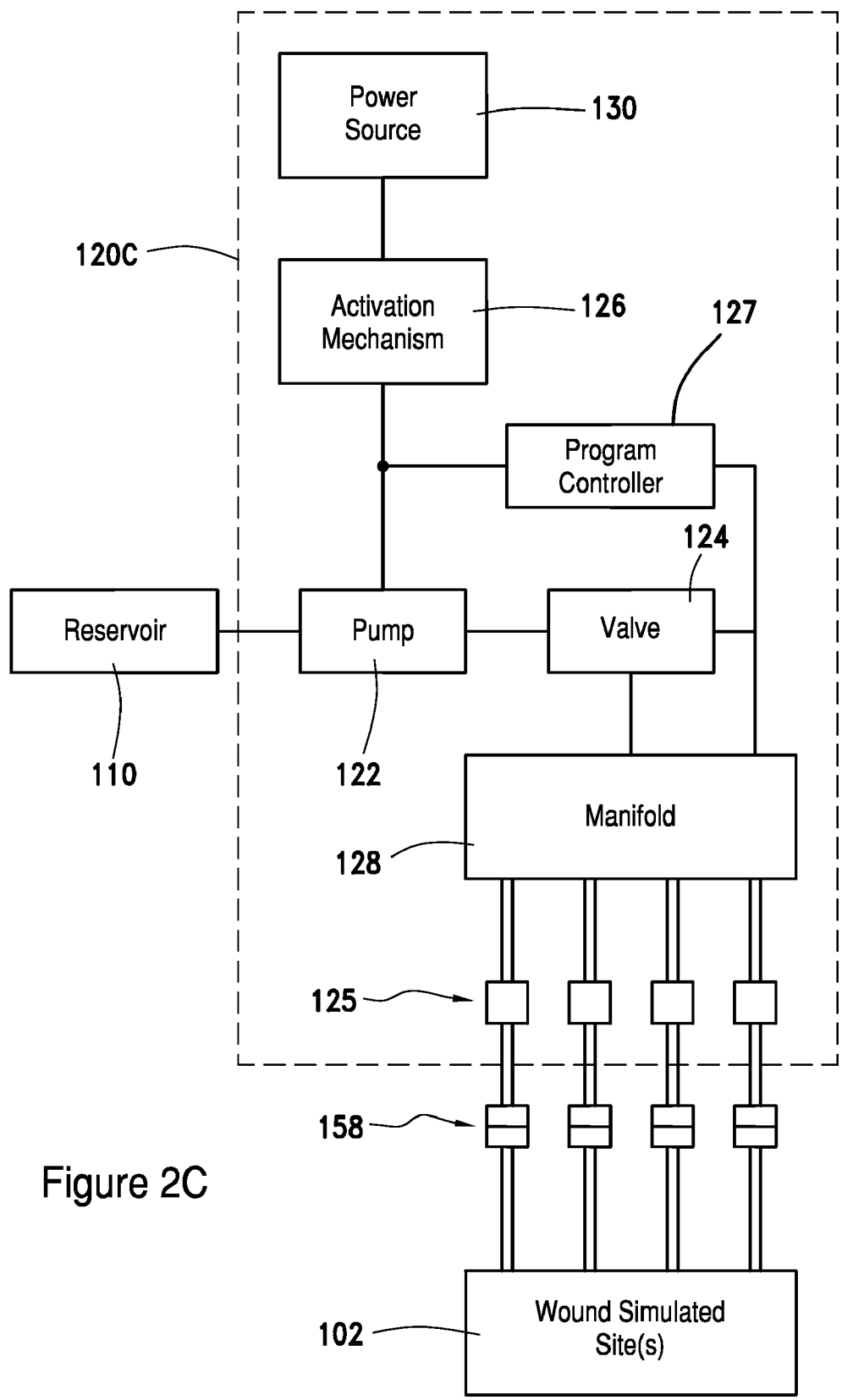

FIGS. 2A-2C illustrate different exemplary embodiments for the fluid flow controller 120 with FIGS. 2B and 2C illustrating the fluid flow controller 120 being connected to the wound site(s) 102 via conduit 150.

FIG. 2A illustrates an exemplary embodiment of the flow controller 120A having a power supply 130 and a controller (or activation mechanism) 126 connected to a pump 122 and a valve 124 such as a solenoid or pin valve. The controller 126 may include a manually activated component such as, for example, a switch, button, or dial. The controller 126 may also be activated by a remote control 160, which is exemplary illustrated, for example, in FIG. 3, which signals a switch or adjustable controller and allows the simulation to be controlled externally of the system by, for example, a trainer. The variable adjustment of the power supplied to the pump 122 allows the fluid volume to be controlled to provide varying amounts of fake blood flow during a particular simulation. The adjustable power supplied to the pump 122 may be provided by a variable adjuster such as a rheostat. The power may also be adjustably supplied to provide a pulsating flow to the simulated wound site(s) that simulates pumped blood.

FIG. 2B illustrates an exemplary embodiment of the flow controller 120B having a power supply 130 and a controller 126 connected to a pump 122 and a valve 124, similar to the embodiment as shown in FIG. 2A. However, the embodiment as illustrated in FIG. 2B includes a manifold 128 connected to the output of the valve 124. The manifold 128 provides an output of fake blood to multiple flow lines such that artificial blood may be provided to various simulated would site(s) 102. Check valves 125 are provided between the manifold 128 and the simulated wound site(s) 102 in order to prevent fluid backflow when the direction of flow for the fake blood is up from the check valve 125. In at least one embodiment, the check valves 125 are replaced with an adjustable valve such as a solenoid or pin valve. Also illustrated are quick connectors 158 (although other types of connectors can be used that includes a diaphragm or other rubber seal capable of resealing upon disconnection to prevent flow of fluid from the end) located in conduit 150 connecting the wound site(s) 102 to the fluid flow controller 120. The quick connectors 158 allow quick and easy line connections to be able to connect different wound site(s) 102 depending upon the desired simulation.

FIG. 2C illustrates an exemplary embodiment of the flow controller 120C of the present invention, including a programmable controller 127 connected to pump 122, valve 124 and manifold 128. The programmable controller 127 allows a user to select which simulated wound site(s) 102 receives fake blood flow. The programmable controller 127 also allows the user to select the flow rate to each simulated wound site(s) 102.

Figure 3:
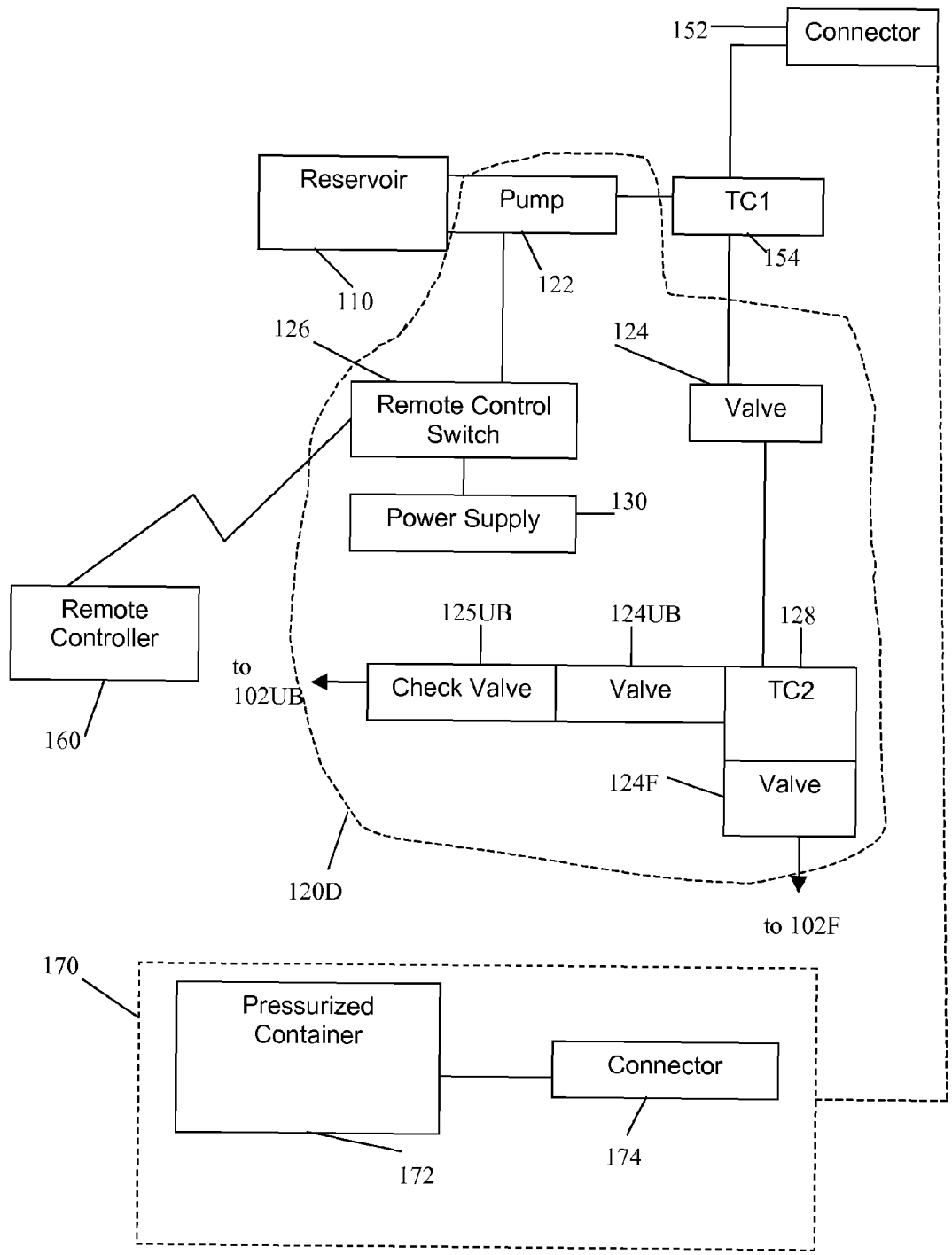
FIG. 3 illustrates a block diagram of a system in accordance with an exemplary embodiment of the present invention.
Figure 4:
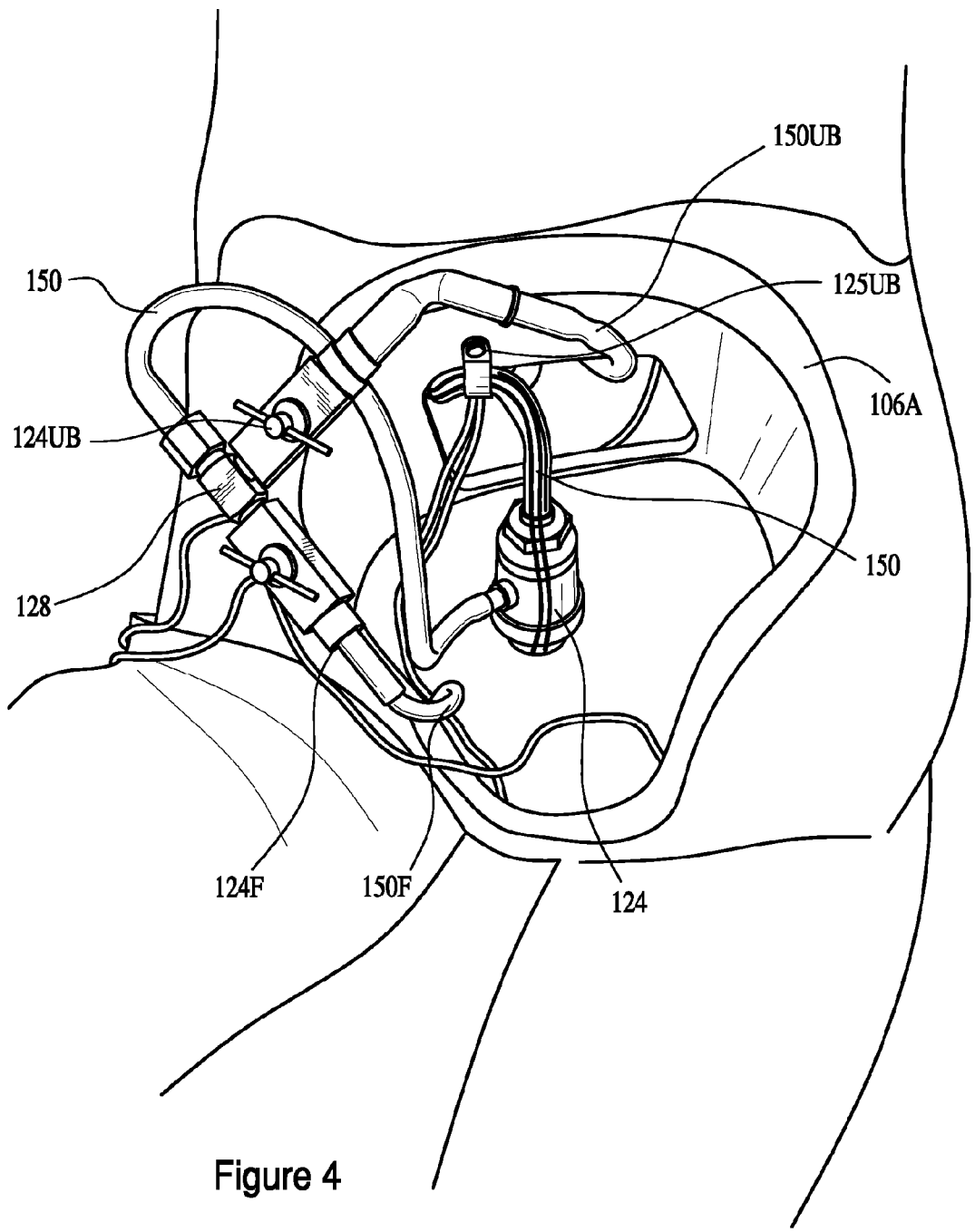
FIG. 4 illustrates an exemplary embodiment of the flow control system illustrated in FIG. 3.

FIG. 3 illustrates an exemplary embodiment of the present invention having a pair of wound sites 102 connected to the flow controller 120D. The two wound sites 102 are located, respectively, on a foot 102F and the upper body 102UB, but could be at a variety of other locations. The illustrated configuration includes a T-connector (or Y-connector or manifold) 128 connected to the valve 124 for providing two fluid streams to the wound sites 102F, 102UB. Illustrated in FIG. 4 is the fluid flow controller 120D connected to conduit 150 for moving the fake blood to the wound sites 102 located in the abdomen region of a mannequin. As illustrated, the conduit 150F, 150UB for each wound site 102F, 102UB is connected to the T-connector 128 through needle valves 124F, 124UB that control the amount of fluid sent to the two respective wound sites 102F, 102UB. Needle valves 124F, 124UB although illustrated as being manual valves may be electrically controlled. The conduit 150UB leading to the upper body wound site 102UB as illustrated may include a check valve (or other one way valve) 125UB after the needle valve 124UB. The check valve 125UB prevents fluid backflow in the system resulting from gravity if the system 100 is seated or in a similar position where the upper body would site 102UB is above the abdomen 106A. Although needle valves are illustrated in FIG. 4, these valves can be any valve that allows for fluid volume control including electrically controlled valves, which have the added benefit of fluid flow adjustment (via a remote controller 160) during the course of the simulation between the two wound sites.

FIG. 3 also illustrates the pressurized refill container 172 and the mechanism 152, 174 for connection into the fluid system internal to the system. The system as illustrated includes a wireless remote controller 160 for activation of the pump 122 and valve 124 through a controller (or remote control switch) 126. The flow controller 120 is powered by power supply 130.

Figure 5:
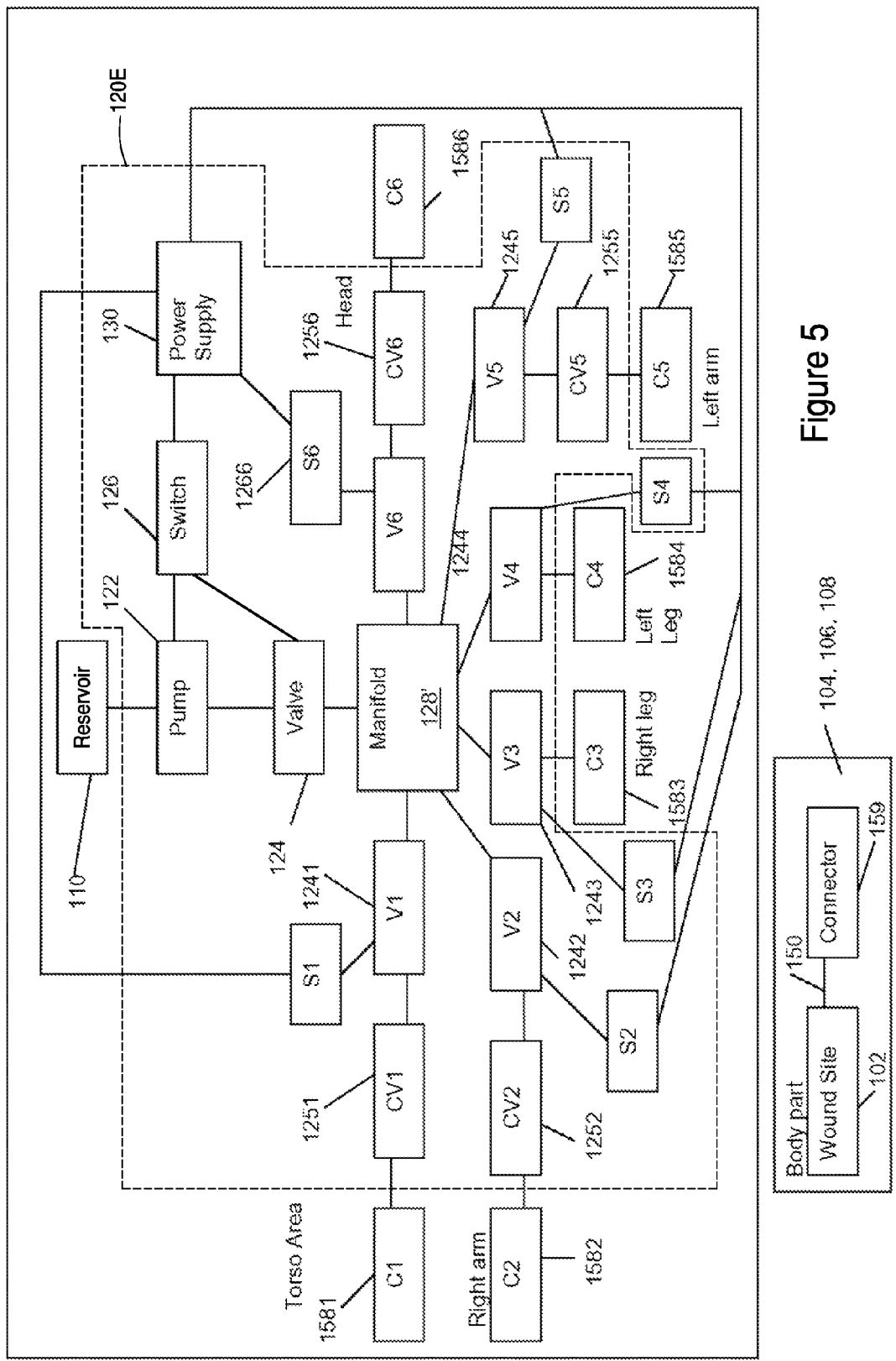
FIG. 5 illustrates an alternative exemplary embodiment of the trauma training system in accordance with the present invention.

FIG. 5 illustrates an exemplary embodiment of the present invention having connection points for providing fluid to multiple extremities to fit the specific hemorrhage simulation. The illustrated arrangement avoids the need to reconfigure the device between simulations. The reservoir 110, the flow controller 120E and a plurality of connectors 1581-1586 form the hub of the system that is connectable to at least one wound site 102. As is illustrated in later figures, the hub can be housed in an enclosure with some embodiments having the connectors 1581-1586 external to the enclosure. The reservoir 110 may connect directly to the flow controller 120E or through a conduit 150. The flow controller 120E when having multiple fluid elements, as illustrated in FIG. 5, may have those fluid elements connected directly or with conduit 150. The plurality of connectors 1581-1586 connect either directly or with conduit 150 to the flow controller 120E and different connectors may be connected in different arrangements to the flow controller to form fluid flow paths to wound site(s) when the respective valve(s) 1241-246 are open.

The system allows for injured body parts or feeds to be connected to the hub, which acts as the hub for the system. The body part locations, for example, include a right arm, a right leg, a left leg, a left arm, and a head along with outer layers of the torso being able to be interchanged to provide a variety of wound site combinations. Alternatively, a body part could be omitted as a potential host of a wound site 102 and thus eliminate one of the connectors and corresponding portion of the flow controller. Or, if multiple flow connections to different parts are desired, then at least one fluid flow path can be added beyond what is illustrated in FIG. 5. Each wound site for a body part will include a wound site 102, a conduit 150, and a connector 159. The conduit 150 connects the wound site 102 to the connector 159. The connector 159 of the body part is designed to attach to a respective connector 1581-1586.

The flow controller 120E as illustrated in FIG. 5 includes a pump 122, a valve 124, and a manifold 128 that are interconnected by conduit 150. The pump 122 and the valve 124 are similar to the pump 122 and valve 124 discussed above, and as discussed above the valve 124 may be omitted. The pump 122 and the valve 124, when present, are on when activated by the controller (or switch) 126 that completes the circuit with the power supply 130.

The flow controller 120E includes a plurality of fluid flow paths extending out from the manifold 128' to be able to connect to a plurality of body parts and provide fluid to any wound sites that might be present on those body parts. Each fluid flow path includes a respective valve 1241-1246 that connect either directly to the manifold 128' or through a conduit 150. Each valve 1241-1246 is independently controllable by individual switches S1-S6 or a control matrix for sending control signals to the respective valves. The switches S1-S6 complete the electrical circuit between the respective valve 1241-1246 and the power supply 130. Alternatively, the valves 1241-1246 may be manually controlled instead of electrically controlled. The valves 1241-1246 are similar to the various valves discussed above and as such a variety of valve types may be used.

The fluid flow paths for the torso, the right arm, the left arm, and the head each include a check valve (or other one way valve) 1251, 1252, 1255, and 1256 to prevent back flow of the fluid from a body part when it is located above the manifold 128'. The fluid flow paths for the legs or other sites below the manifold may also include the check valve. Each check valve is illustrated as being connected to the respective valve by conduit 150. The end of the flow path for the flow controller 120E is a connector 1581-1586 that connects with a respective body part location 104, 106, 108 having a wound site 102.

The pump 122 and the system of valves 124, 1241-1246 in at least one exemplary embodiment are controllable with a remote controller 160 (not shown in FIG. 5). This remote operation allows for additional control other the routing of fluid through the system including development of additional hemorrhage sites during the course of a particular simulation such as in response to restrictions (like tourniquets) on blood flow or general degradation of the patient over time.

While the system is outlined generally above, it may be utilized in many embodiments, including cooperating with, housed in, or integrated with, for example, a mannequin, a bag or backpack, a belt, or a bodysuit. The system can be retrofitted into an existing mannequin or other housing.

FIGS. 6A-9C illustrate embodiments where the system is incorporated into a mannequin. Exemplary locations of the integrated reservoir 110 include, for example, the torso area 106, the head 104, the extremities 108, or any combination thereof. The particular placement of the reservoir 110 depends, at least in part, on the implementation and the amount of fluid desired to be available for a particular simulation. However, placement of the reservoir 110 and the flow controller 120 in the torso 106 provides the greatest flexibility for placement of the wound sites 102 particularly in implementations where fluid is routed to wound sites in a variety of locations.

The reservoir 110 and the flow controller 120 are preferably stored within the mannequin 100A, which provides protection for these components, as illustrated, for example, in FIG. 6A. As illustrated in FIGS. 6A and 6B, the reservoir 110 may be a separate component; however, the reservoir 110 may also be built into or integrally formed with the mannequin 100A as storage space. As discussed previously, the flow controller 120 may also be housed in specific compartments formed inside the mannequin 100A. The flow controller 120 in whole or in part may also be incorporated into the reservoir 110.

Figure 6C:
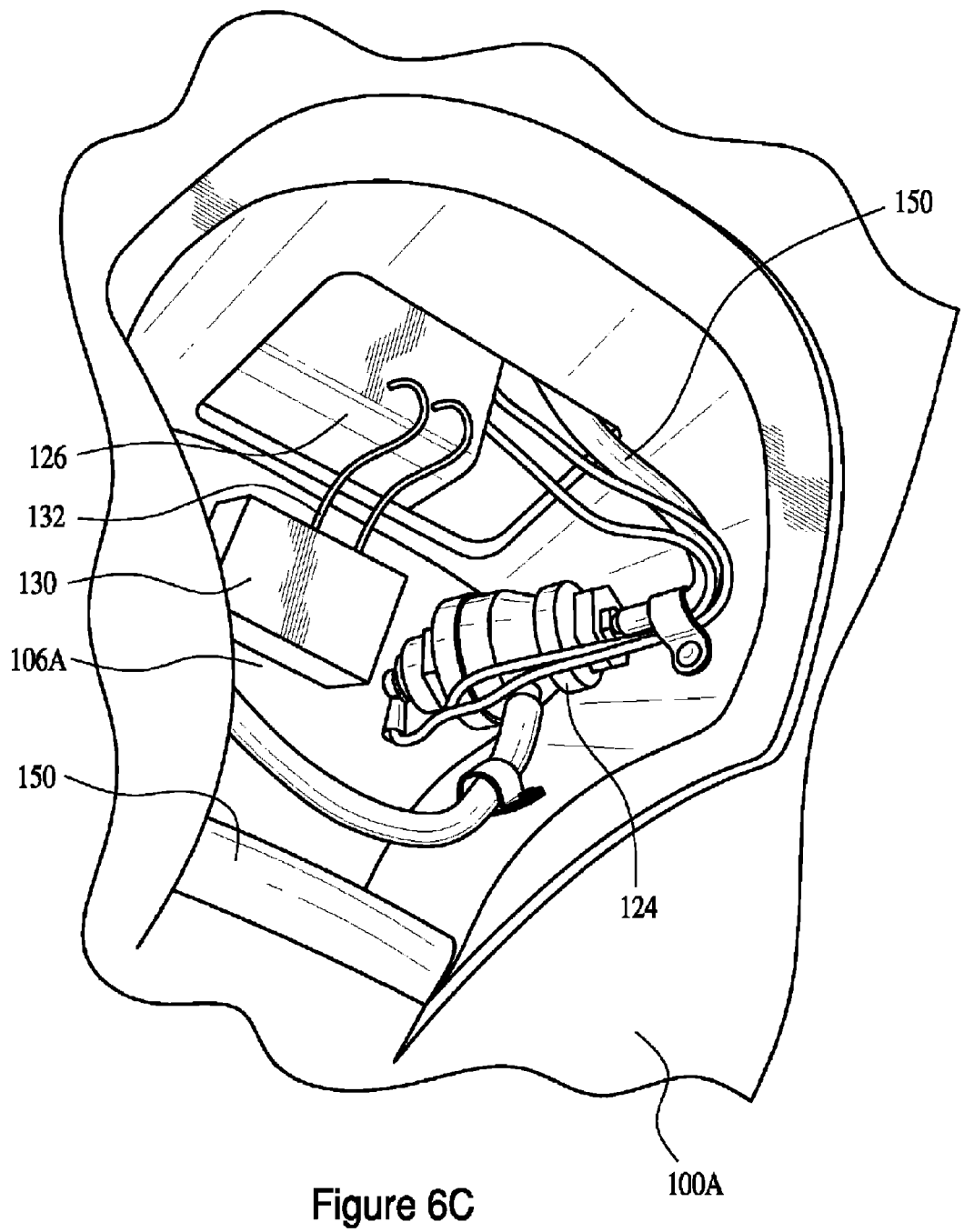
FIG. 6C illustrates the abdominal cavity of a trauma training system illustrated in FIG. 6A.

FIGS. 6A-6C illustrate an exemplary embodiment of the system of the present invention. The system includes a mannequin 100A having a chest cavity 106C and an abdomen cavity 106A. The chest cavity 106C and abdomen cavity 106A are utilized to contain components of the system, including the reservoir 110, the flow controller 120, and conduit 150. The cavity 106C is covered by a chest plate 106CP. The illustrated flow controller 120 includes a power supply 130, a controller 126, a pump 122, and a valve 124. Each of the components is securely mounted inside the cavities 106C, 106A.

The reservoir 110 can be a variety of sizes, but as illustrated in FIG. 6A is a ten (10) liter collapsible container. The size is constrained by the space inside the system and the desire to have ample storage of fluid for a particular hemorrhage simulation. The reservoir 110 supplies the fluid, such as fake blood, to the system. The reservoir 110 as illustrated is mounted inside of the chest cavity 106C of the mannequin 100A, but alternatively may be a compartment integrally formed with the mannequin 100A.

The pump 122 may be directly connected to the reservoir 110 as illustrated in FIG. 6B. However, the pump 122 also may connect to the reservoir 110 through a conduit 150. As illustrated in FIG. 4, the pump 122 is mounted on the reservoir 110. The pump 122 may also be a submersible pump that fits inside the reservoir 110. The pump 122 is powered by the power supply 130 to pump the fake blood into the conduit 150 connected to the wound site(s) 102 to simulate a hemorrhage.

To allow for portability of the system during training, the mannequin 100A houses a switch 126 and a power supply 130 located in a space above and/or in the abdominal cavity 106A. Each of these components can be encased in a protective cover to be protected from any leakage that might occur from the reservoir 110 or one of the fluid connection points. An exemplary power supply 130 is a 12 volt rechargeable battery. A rechargeable power supply 130 lacks power cords and provides a more realistic simulation. However, any suitable power supply may be used.

The valve 124, illustrated in FIG. 6C, allows the mannequin 100A to be seated upright and prevents fluid leakage when the pump 122 is not operating. The valve 124 also prevents drainage of the fake blood present between the pump 122 and the valve 124 after the pump 122 is turned off. Exemplary valves 124 include a solenoid inside a pipe fitting, as illustrated in FIG. 6C, or a check valve. The solenoid as illustrated is activated when the pump 122 is operating. The controller 126 connects the power supply to both the valve 124 and the pump 122. One of ordinary skill in the art will appreciate based on this disclosure that the valve 124 may be omitted while still maintaining the usefulness and novelty of the system. As illustrated, the valve 124 is located in the abdominal cavity 106A and is connected via conduit 150 to the pump 122. The valve 124 is mounted on a wall of the abdominal cavity 106A and includes an output connected to conduit 150 running to the simulated wound site(s) 102 on the system 100.

Figure 7A:
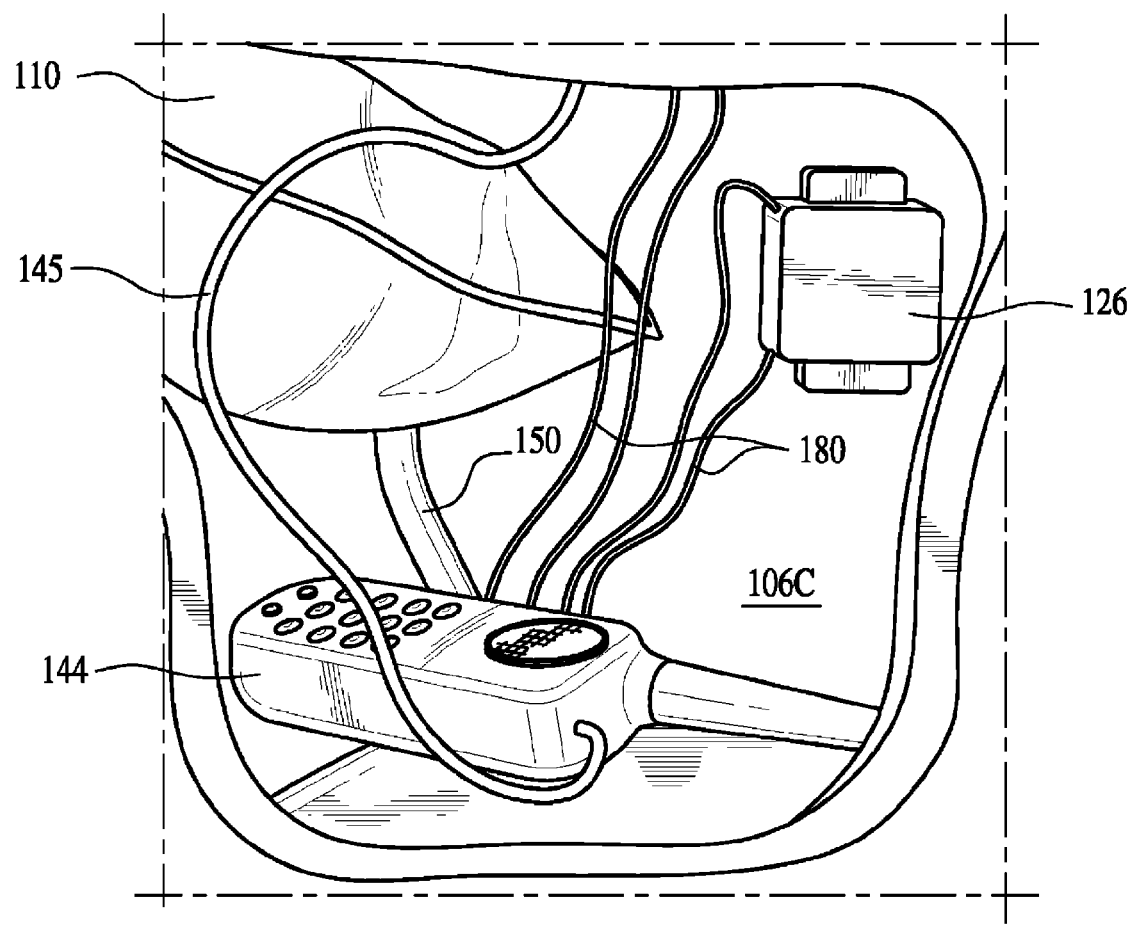
FIG. 7A illustrates the chest cavity of the trauma training system in accordance with an exemplary embodiment of the present invention.
Figure 7B:
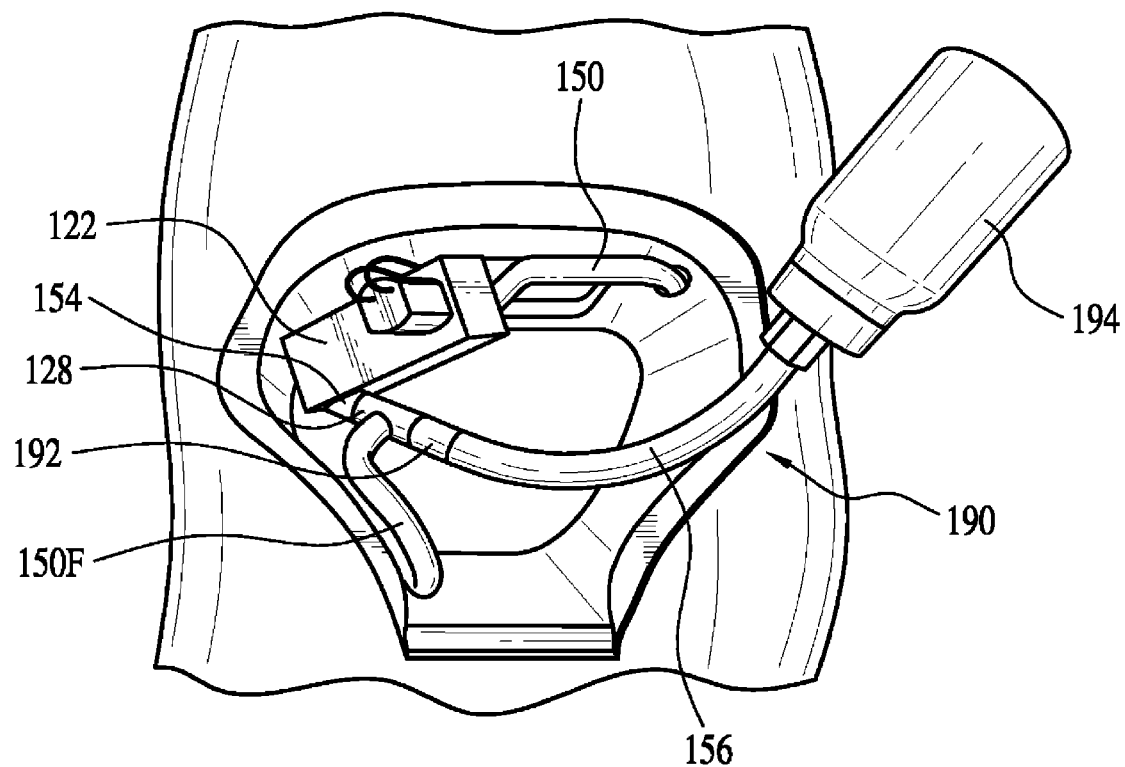
FIG. 7B illustrates the abdominal cavity of the trauma training system in accordance with an exemplary embodiment of the present invention.

FIGS. 7A and 7B illustrate exemplary chest and abdomen cavities 106C, 106A of a mannequin 100A that includes an exemplary audio system 140. The wire harness 180 present in the chest cavity 106C in FIGS. 7A and 7B includes wires 145 for the audio system 140 and power cables 132. The reservoir 110 (illustrated as partially removed from the cavity 106C), the control switch 126 of the flow controller 120, and the two-way radio 144 are located in the chest cavity 106C and covered by a chest plate 106CP. The reservoir 110 connects to the pump 122 through conduit 150 which runs between the two cavities 106C, 106A. The reservoir 110 illustrated in FIG. 7A is a flexible bag similar to that of a blood or IV bag that holds approximately 1 liter of fluid. Different size containers can be utilized for the reservoir, along with the container being made of hardened plastic or flexible material. The reservoir 110 can also be built into the mannequin 100A. The illustrated controller 126 faces out of the mannequin 100A and is accessible from the rear 106B of the mannequin 100A. The controller 126 in this exemplary embodiment is a switch or other toggle mechanism.

The abdomen cavity 106A in FIG. 7B is illustrated as housing a flow controller 120 and a backflow system 190. The illustrated flow controller 120 includes a pump 122, which is illustrated as a gravity pump, and a T-connector 128. The T-connector 128 allows for connection of the backflow system 190, which handles any backflow resulting from treatment during a simulation such as application of a tourniquet. The backflow system 190 includes a conduit 156 with a back pressure diaphragm (or other one way valve) 192 and a backflow container 194 (illustrated as pulled out from the cavity 106A). Alternatively, the reservoir 110 with a feedback conduit 156 recycling the fluid back to the reservoir 110 may take the place of the container 194. The connection between the power supply 130 and the pump 122 is controlled by the controller 126 present in the chest cavity 106C.

Figure 8:
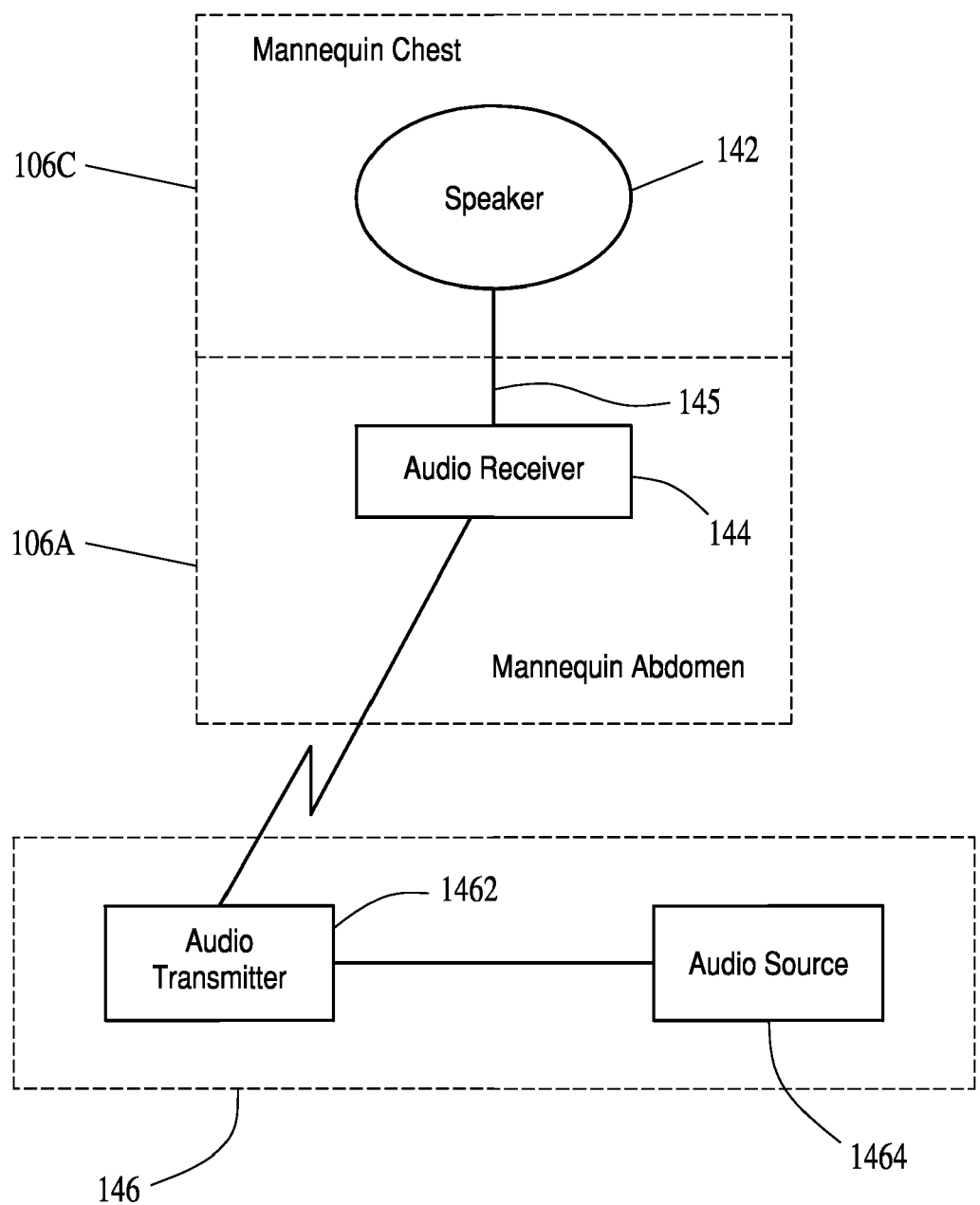
FIG. 8 illustrates a block diagram of an exemplary trauma training system, including audio system, in accordance with the present invention.
Figure 9A:
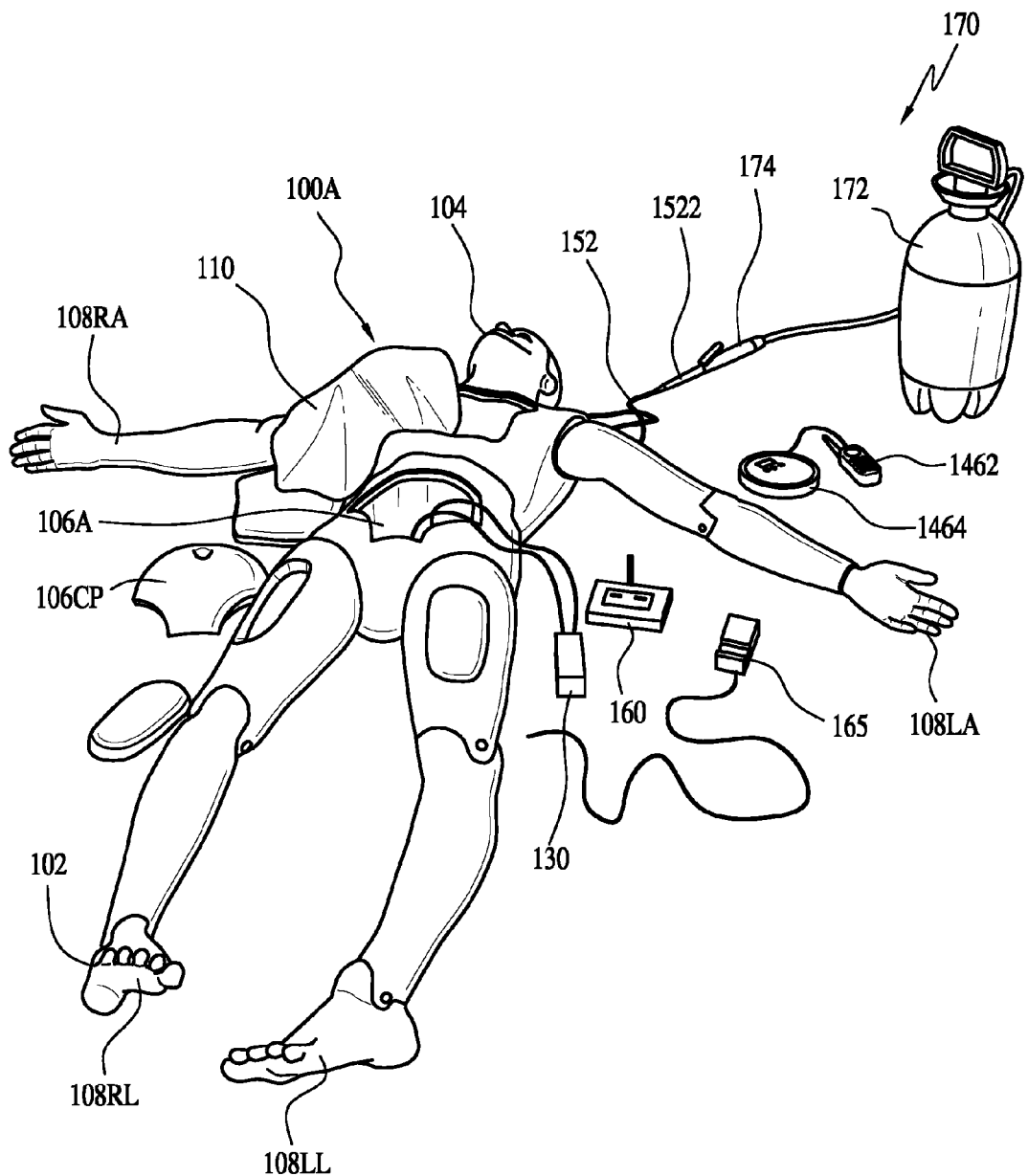
FIG. 9A illustrates a trauma training system in accordance with an exemplary embodiment of the present invention.

FIG. 8 illustrates an exemplary audio system 140. The audio system 140 includes an internal audio source (or audio receiver) 144, which is illustrated as a two-way radio or walkie-talkie mounted on the bottom of the chest cavity 106C in FIG. 7A. The audio source 144 receives (or provides) an audio feed and relays signals to a speaker 142 located in the mannequin 100A, for example in the head 104, via a cable 145. The audio source 144 may receive a wired or wireless signal from an external audio source 146. As illustrated in FIGS. 8 and 9A, the external audio source 146 includes an audio transmitter 1462 that is in wireless communication with the internal audio source 144 (although the link could be wired) and an audio source 1464. The audio source 1464 may be connected to the audio transmitter 1462 by a cable 145. The audio transmitter 1462 may also be integrally formed with the audio source 1464. The audio system 140 may also be located completely in the head 104 of the mannequin 100A with the speaker 142 connected to or integrally formed with the audio source 1464. Although two-way radios are illustrated, other wireless communication devices could be used. In at least one embodiment without a mannequin, the audio receiver and the speaker together are an ear piece.

The audio system 140 provides a means for providing audio cues to the individuals participating in the simulation. The audio system enables interactive training by providing a "simulation tree" where the system reacts to the actions and choice made by the trainee such that more specialized and realistic training is possible.

FIG. 9A also illustrates, in addition to the audio system 140 shown in FIG. 8, a remote audio source 146, a refill system 170, a battery recharger 165, a remote control 160, as well as several extremities 108. Each of the extremities 108, including right arm 108RA, left arm 108LA, right leg 108RL, and left leg 108LL, have wound sites 102 that are interchangeable. These wound sites 102 are capable of being switched out and replaced with wound sites on other extremities such that any extremity may include a variety of wound sites 102. The audio system 140 is discussed above and is illustrated as including an external audio source 1464 such as a CD player. The battery recharger 165 recharges a reusable power supply 130. The remote control 160 provides a mechanism to control the operation of fluid flow by controlling the controller 126 and in at least one exemplary embodiment at least one valve 124.

Figure 9B:
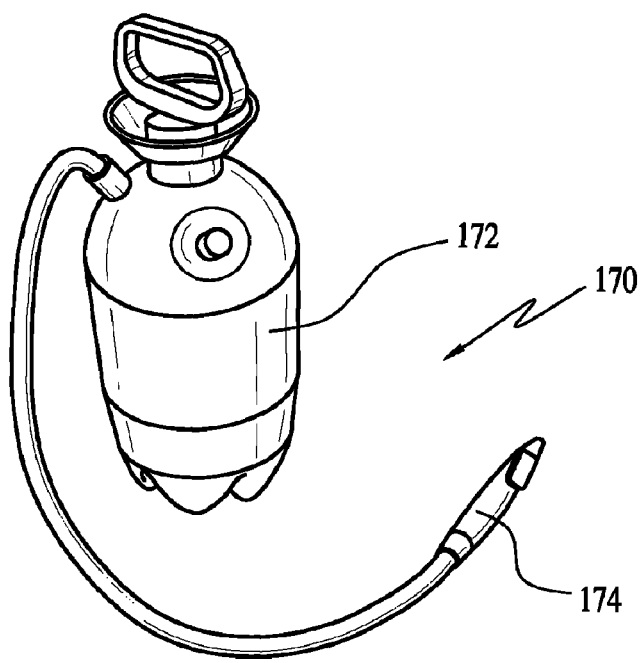
FIG. 9B illustrates a refill system illustrated in FIG. 9A.
Figure 9C:
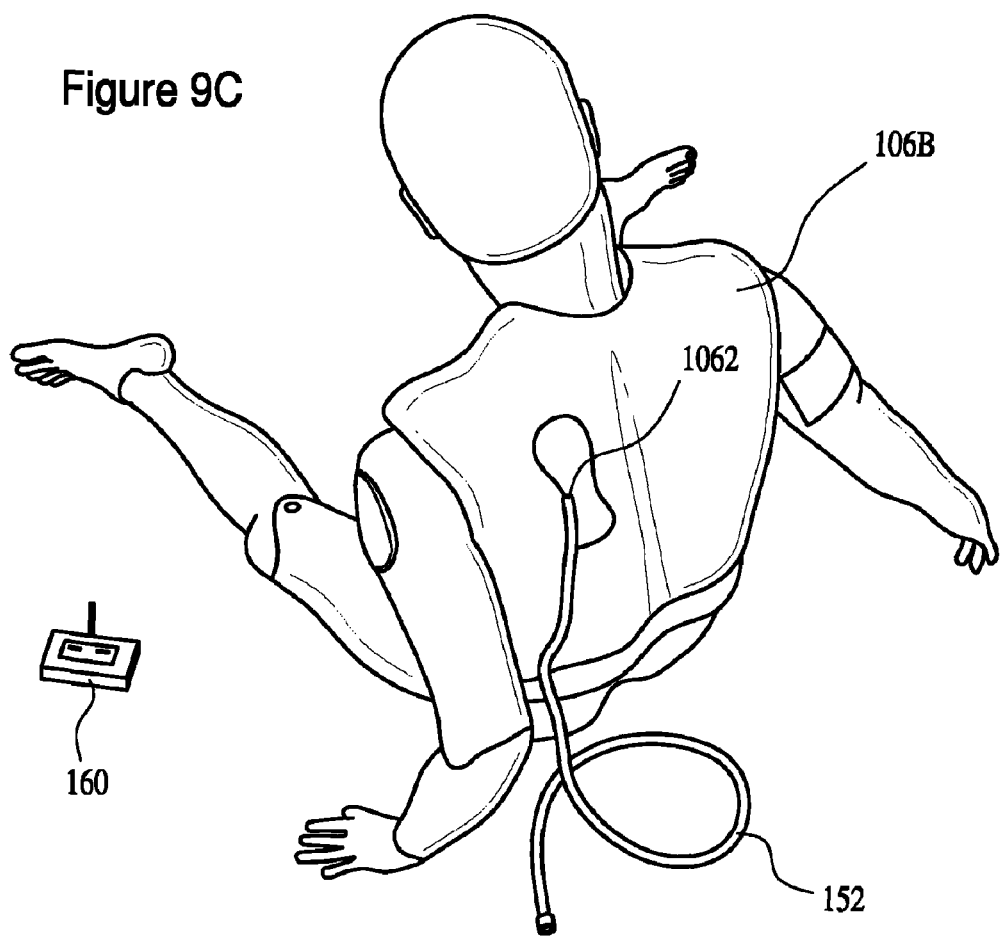
FIG. 9C illustrates a backside view of a trauma training system illustrated in FIG. 9A.

FIGS. 9B and 9C illustrates an exemplary embodiment of the refill system 170. The refill system includes an external container 172 and a male quick release connector 174 attached to a hose. The container 172, as illustrated, is a manually pressurized container that can be used to refill the reservoir 110 with a pressurized stream of fluid. However, a variety of other external containers 172 may be used to accomplish the function of refilling the fluid reservoir 110. As illustrated in FIGS. 9A and 9C, the refill system 170 includes a conduit 152 connected to the reservoir 110 via a T-connector 154 that provides a connection point into the fluid system, as illustrated in FIG. 6B. Also, the refill system 170 may be omitted and the reservoir 110 refilled by disconnecting the reservoir 110 from the pump 120. As illustrated in FIG. 9C, the refill conduit 152 exits from the back 106B of the system 100 through an opening 1062 with storage space for conduit 152 that is covered during simulations when the refill conduit 152 is placed inside the system 100. The illustrated refill conduit 152 includes a female quick release connector 1522 to connect to the external container 172 having a male quick release connector 174.

Figure 10:
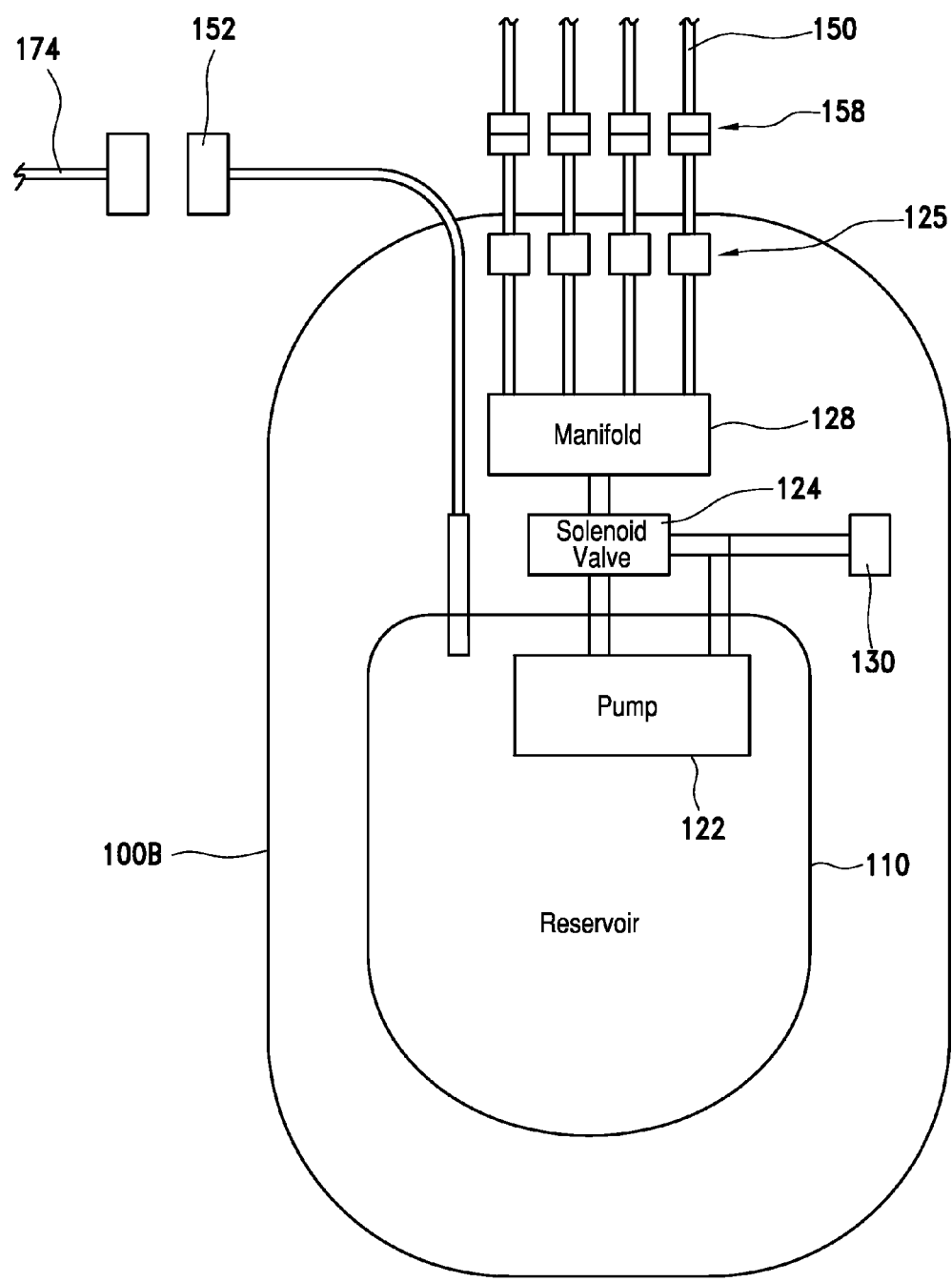
FIG. 10 illustrates an exemplary portable embodiment of the trauma training system in accordance with the present invention.

FIG. 10 illustrates an exemplary embodiment of the present invention provided in a portable container 100B. The reservoir 110 and the flow controller 120, similar to embodiments illustrated in FIG. 2A-C, are enclosed in the container 100B. Container 100B may, for example, be a backpack, shoulder bag or elastic bag having an opening such as a zipper. In at least one embodiment, the elastic bag will contract onto the contents as fluid is dispensed from the reservoir 110 allowing the pump to remain in contact with the fluid still present in the reservoir 110 and thus primed for pumping. The portable container allows live participants to attach the system of the present invention to their bodies and locate the simulated wound sites 102 at a variety of locations on their bodies. This allows for a more realistic simulation of a live casualty by enabling the live participant to provide more meaningful feedback to the trainee. The valves 128 include means that can restrict flow through the fluid pathway including clamps applied to the conduit. FIG. 10 also illustrates an exemplary refill conduit 152 and refill connector 174. The conduit 152 in at least one embodiment passes through a cap of the reservoir 110 and in other embodiments passes through its own opening proximate to the pump's location in the reservoir 110.

Figure 11:
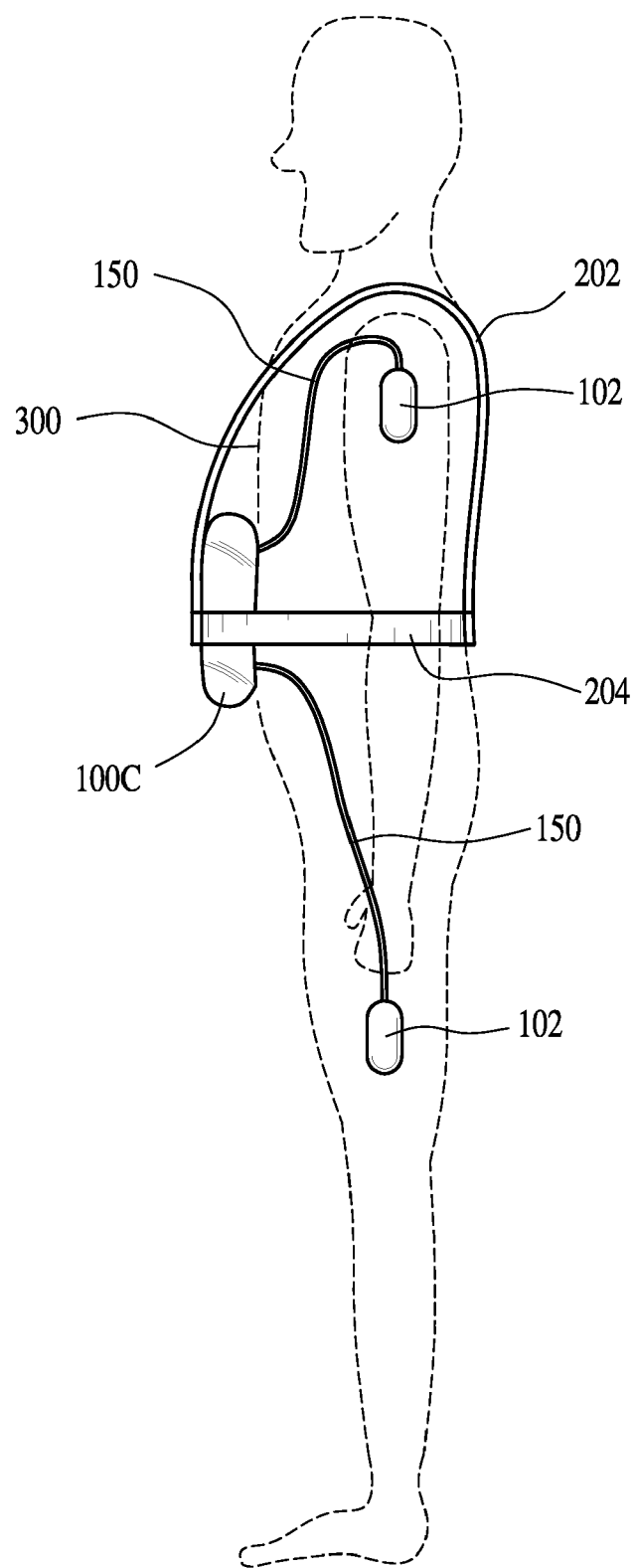
FIG. 11 illustrates a portable trauma training system in accordance with the present invention.

FIG. 11 illustrates an exemplary embodiment of the present invention utilizing a bag 100C for storing the trauma training system. The bag 100C may be a backpack, body bag, shoulder bag, elastic bag, or the like, and is used to enclose and attach the trauma training system to a system or live participant. The bag 100C preferably includes a compartment for storing all components of the trauma training system, including the container, controller and flow tubes. The bag 100C may be designed to fit closely to the body of the system or live participant 300 such that it is not disruptive to the training process. The bag 100C may also include one or more holes for tubes 150 to pass through to the simulated wound sites 102 as illustrated in FIG. 11. The bag 100C may include shoulder straps 202 and/or a belt 204 to help secure the bag. The bag 1800 may also include a detachable harness (not shown) to mount the bag to the system or live participant 1810. In other embodiments, the bag 100C is incorporated into a body suit 100D.

Figure 12:
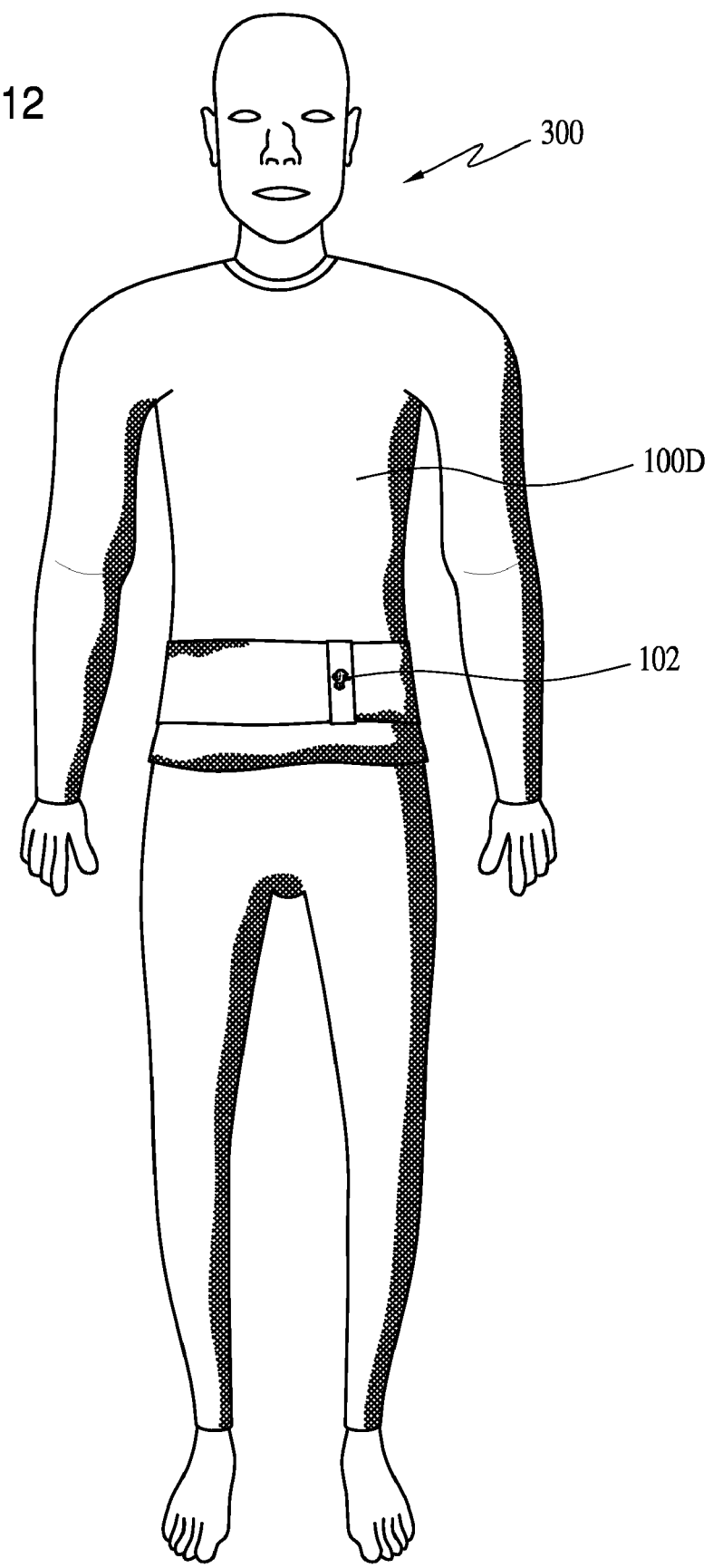
FIG. 12 illustrates a portable trauma training system in accordance with the present invention.

FIG. 12 illustrates an exemplary embodiment of the trauma training system that utilizes a body suit 100D. The body suit 100D which may be made of a stretch material, such as elastic or Spandex®, is provided on a mannequin or live participant to simulate wounds. An exemplary simulated wound site 102 is shown on a participant 300 wearing a body suit 100D. The illustrated wound site 102 is located on a partial body suit or belt that covers the abdomen. The partial body suit may be made of the same stretch material as the body suit 100D. The system of the present embodiment utilizes any of the systems of the various embodiments outlined above, including the mannequin and backpack embodiments, in order to provide fluid flow to simulated wound sites 102. The flow controller may be contained either inside the system or backpack, as outlined above, or contained inside the body suit 100D. Another location for reservoir 110 and flow controller 120 is to be located in a fake utility belt 100E illustrated in FIG. 13 with shell areas for holding the components and connecting to conduit 150 laid below the surface of the body suit 100D or embedded in the body suit 100D. The body suit 100D also conceals the fluid flow conduits placed underneath the body suit, and one exemplary location the fluid conduits are along the seams of the body suit or between layers of material. This allows the simulated wound sites 102 to be exposed on the body suit or to be hidden underneath clothing worn over the body suit 100D. The body suit 100D may provide various levels of body coverage, including full body coverage and partial body coverage covering, for example, the abdomen, torso, an arm or leg. The components of the system may also be stored in a belt, such as a utility belt. The utility belt may be fashioned to conceal the components so as to provide additional realism to the system.

Figure 13:
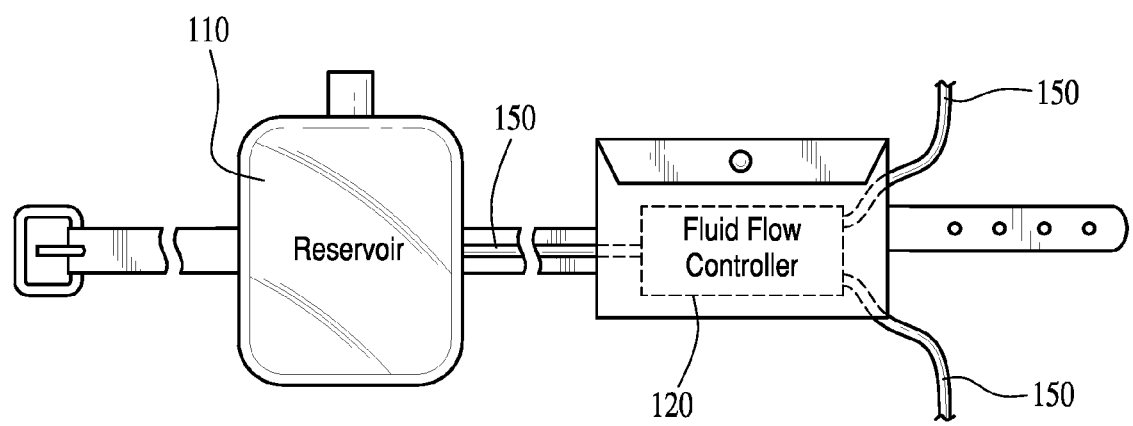
FIG. 13 illustrates a portable trauma training system in accordance with the present invention.

FIG. 13 illustrates an exemplary embodiment with a belt such as a utility belt housing the system. A reservoir 110 shaped like a canteen is on one part of the belt and a storage bin contains the fluid flow controller 120 with the two components being connected via conduit 150. The housing for the reservoir 110 in at least one embodiment where the reservoir 110 is collapsible includes a door that allows the user to prime the pump 122 by compressing the collapsible reservoir 110. In at least one embodiment, an elastic band (or bag) rings the reservoir 110 to facilitate the reservoir in collapsing on itself. In at least one embodiment, the pump 122 is a submersible pump in the reservoir 110. The fluid flow controller 120 is illustrated as having two conduits 150 attached to it for providing fake blood to wound sites 102. Based on this disclosure, one of ordinary skill in the art will appreciate that a variety of number of wound sites could be feed by the fluid flow controller 120. As mentioned above, the conduits 150 connected to wound sites 102 could be feed beneath clothing, incorporated into the material of the clothing, or run above the clothing worn by an individual or mannequin.

In at least one embodiment, the system will include multiple pairs of reservoirs and pumps to supply a common manifold. Having multiple reservoirs allows for the individual reservoirs to be smaller and more easily placed on a participant and hidden from trainees. In further embodiments, the smaller reservoir with a pump will be located proximate to the wound site.

It will be understood that each block of the block diagrams and combinations of those blocks can be implemented by means for performing the illustrated function.

The exemplary and alternative embodiments described above may be combined in a variety of ways with each other. Furthermore, the steps and number of the various steps illustrated in the figures may be adjusted from that shown.

It should be noted that the present invention may, however, be embodied in many different forms and should not be construed as limited to the embodiments set forth herein; rather, the embodiments set forth herein are provided so that the disclosure will be thorough and complete, and will fully convey the scope of the invention to those skilled in the art. The accompanying drawings illustrate exemplary embodiments of the invention.

Although the present invention has been described in terms of particular exemplary and alternative embodiments, it is not limited to those embodiments. Alternative embodiments, examples, and modifications which would still be encompassed by the invention may be made by those skilled in the art, particularly in light of the foregoing teachings.

Those skilled in the art will appreciate that various adaptations and modifications of the exemplary and alternative embodiments described above can be configured without departing from the scope and spirit of the invention. Therefore, it is to be understood that, within the scope of the appended claims, the invention may be practiced other than as specifically described herein.

I claim:

1. A trauma training system for replicating at least one hemorrhage, said system comprising:
    a body resembling at least a portion of a human body,
    a container housed within said body,
    a collapsible reservoir capable of storing fluid,
    a pump in fluid communication with said reservoir,
    at least one valve in fluid communication with said pump,
    a controller connected to said pump and said at least one valve, wherein said collapsible reservoir, said pump, and said controller are housed within said container,
    a remote control for controlling the operation of said controller, and
    at least one wound site detachably in fluid communication with said valve, wherein fluid is provided to said at least one wound site to simulate a hemorrhage.

2. The trauma training system according to claim 1, wherein said at least one wound site includes:
    a first wound site conduit connected to said valve,
    a first wound site connected to said first wound site conduit,
    a second wound site conduit connected to said valve, and
    a second wound site connected to said second wound site conduit.

3. The trauma training system according to claim 1, wherein said at least one valve is housed within said container.

4. The trauma training system according to claim 1, wherein said at least one valve includes a solenoid electrically connected to said controller.

5. The trauma training system according to claim 1, wherein said controller is selected from a group consisting of a switch, a dial, a button, and a circuit.

6. The trauma training system according to claim 1, further comprising:
    a manifold connected to said at least one valve,
    a second of said at least one valve connected to said manifold,
    a first wound site conduit connected to said second valve and one of said at least one wound site,
    a third of said at least one valves connected to said manifold, and
    a second wound site conduit connected to said third valve and a second of said at least one wound site.

7. The trauma training system according to claim 6, wherein said flow controller further includes a check valve in at least one of said first and second wound site conduits.

8. The trauma training system according to claim 1, further comprising:
    a back flow system, wherein said back flow system includes:
        a branch connector connected to said pump,
        a back flow conduit connected to said branch connector,
        a check valve present in said back flow conduit, and
        a back flow container connected to said back flow conduit; and
    a wound site conduit connecting said branch connector to said at least one wound site.

9. The trauma training system according to claim 1, further comprising a back flow system including:
    a branch connector connected to said pump,
    a back flow conduit connected to said branch connector and said reservoir,
    a check valve present in said back flow conduit, and
    a wound site conduit connecting said branch connector to said wound site.

10. The trauma training system according to claim 1, further comprising:
    a branch connector fluidly connected to said reservoir having one branch forming a flow path with said at least one wound site and a second branch; and
    a refill conduit connected to said second branch, said refill conduit having a connector for connection to an external fluid source.

11. The trauma training system according to claim 1, further comprising an audio system, wherein said audio system includes a receiver and a speaker connected to said receiver.

12. The trauma training system according to claim 1, further comprising:
    a manifold connected to said at least one valve,
    a plurality of conduit connected to said manifold for connection to a wound site, and
    wherein said controller includes a programmable controller in communication with at least one of said pump, said valve, and said manifold, wherein said programmable controller controls the delivery of fluid to each of said wound site.

13. A trauma training system comprising:
    a mannequin having an internal cavity,
    a reservoir housed in said internal cavity of said mannequin,
    a flow controller in fluid communication with said reservoir and housed in said internal cavity of said mannequin, wherein said flow controller includes:
        a pump in fluid communication with said reservoir,
        a valve in fluid communication with said pump,
        a power supply connected to said pump and said valve,
        a manifold in fluid communication with said valve, and
        a plurality of conduits connected to said manifold, each conduit includes a connector on its free end, and at least one wound site disposed on said mannequin and in fluid communication with said flow controller, wherein fluid is delivered from said reservoir to said wound site to simulate a hemorrhage.

14. The trauma training system according to claim 13, wherein said mannequin includes at least one extremity, and said at least one wound site is located on said at least one extremity.

15. The trauma training system according to claim 13, wherein said at least one wound site comprises multiple wound sites disposed at various locations on said body.

16. A trauma training system comprising:
a collapsible reservoir,
a pump in fluid communication with the cavity of said reservoir,
a valve connected to said pump,
a controller connected to said pump and said valve,
a mannequin having an internal housing, said internal housing containing said reservoir, said pump, and said valve, and
at least one wound site detachably connected to said valve.

17. The trauma training system according to claim 16, further comprising:
a manifold connected to said valve,
a plurality of conduit connected to said manifold, each conduit having a connector at its free end, said connector includes a seal, and
each of said at least one wound site includes a conduit with a connector configured to engage a connector of a conduit connected to said manifold.

18. The trauma training system according to claim 16, further comprising:
a refill conduit in fluid communication with said reservoir, said refill conduit having a connector at its free end, said connector includes a seal.

* * * * *